(12) United States Patent
Feng et al.

(10) Patent No.: US 9,312,960 B1
(45) Date of Patent: Apr. 12, 2016

(54) REDUCING POWER REQUIREMENTS FOR OPTICAL LINKS

(71) Applicant: Kotura, Inc., Monterey Park, CA (US)

(72) Inventors: Dazeng Feng, El Monte, CA (US); Mehdi Asghari, Pasadena, CA (US)

(73) Assignee: Mellanox Technologies Silicon Photonics Inc., Monterey Park, CA (US)

( * ) Notice: Subject to any disclaimer, the term of this patent is extended or adjusted under 35 U.S.C. 154(b) by 7 days.

(21) Appl. No.: 14/280,067

(22) Filed: May 16, 2014

Related U.S. Application Data

(60) Provisional application No. 61/825,501, filed on May 20, 2013.

(51) Int. Cl.
    *H04J 14/02* (2006.01)
    *H04B 10/516* (2013.01)
    *H04B 10/60* (2013.01)

(52) U.S. Cl.
    CPC .............. *H04B 10/516* (2013.01); *H04B 10/60* (2013.01); *H04J 14/02* (2013.01)

(58) Field of Classification Search
    CPC ....... H04J 14/02; H04J 14/0221; H04J 14/04; H04B 10/506; H04B 10/572; H04B 10/503; H04B 10/564; H04B 10/516; H04B 10/60; H04B 10/0795; H04B 10/2504; H05K 1/141; G02F 1/0147
    USPC ........... 398/79, 90, 93, 94, 95, 192, 194–197, 398/140, 180, 183, 158
    See application file for complete search history.

(56) References Cited

U.S. PATENT DOCUMENTS

| | | | | |
|---|---|---|---|---|
| 6,122,302 A * | 9/2000 | Dean | .......................... | 372/29.021 |
| 6,243,404 B1 * | 6/2001 | Joyce | ................................ | 372/34 |
| 7,636,522 B2 * | 12/2009 | Nagarajan et al. | .............. | 398/79 |
| 7,961,766 B2 * | 6/2011 | Chen et al. | .................. | 372/29.02 |
| 8,036,534 B2 * | 10/2011 | Matsumoto | ...................... | 398/95 |
| 8,521,038 B1 * | 8/2013 | Wach | ............................ | 398/200 |
| 8,699,533 B1 * | 4/2014 | Wach | ............................... | 372/34 |
| 9,031,412 B2 * | 5/2015 | Nagarajan et al. | .............. | 398/95 |
| 2003/0011841 A1 * | 1/2003 | Lee | .................................. | 359/124 |
| 2005/0069332 A1 * | 3/2005 | Jang et al. | ...................... | 398/192 |
| 2005/0078957 A1 * | 4/2005 | Hendow | .......................... | 398/33 |
| 2006/0088319 A1 * | 4/2006 | Morton | ........................... | 398/79 |
| 2007/0081823 A1 * | 4/2007 | Lee et al. | ........................ | 398/79 |
| 2010/0166424 A1 * | 7/2010 | Nagarajan et al. | .............. | 398/79 |
| 2010/0296812 A1 * | 11/2010 | Asghari | ........................... | 398/82 |
| 2014/0111793 A1 * | 4/2014 | Asghari et al. | .................. | 356/73 |

* cited by examiner

*Primary Examiner* — Hibret Woldekidan
(74) *Attorney, Agent, or Firm* — Gavrilovich, Dodd & Lindsey, LLP

(57) ABSTRACT

An optical system includes a device selected from a transmitter and a receiver. The transmitter has multiple laser cavities that each generates an optical channel at a different channel wavelength. The transmitter is also configured to modulate the optical channels into modulated light signals. The receiver is configured to demultiplex modulated light signals and use the demultiplexed light signals to generate electrical signals. The device is configured to operate in an atmosphere having an operational temperature range that includes a range of temperatures extending from TL to TH. Electronics are configured to elevate the temperature of the device when the temperature of the atmosphere is in a first portion of the temperature range from TL to TH but not elevate the temperature of the controlled device when the temperature of the atmosphere is in a second portion of the temperature range from TL to TH.

20 Claims, 10 Drawing Sheets

REDUCING POWER REQUIREMENTS FOR OPTICAL LINKS

CROSS REFERENCE TO RELATED APPLICATIONS

This application claims the benefit of U.S. Provisional Application No. 61/825,501, filed May 20, 2013, the disclosure of which is incorporated herein by reference in its entirety.

FIELD

The present invention relates to optical links and more particularly to power requirements of these optical links.

BACKGROUND

Optical communication systems often employ one or more WDM (Wavelength Division Multiplexed) optical links that typically include a transmitter in optical communication with a receiver. The transmitter generates multiple modulated light signals that are received by the receiver. The receiver demultiplexes the modulated light signals and, in some instances, uses the demultiplexed light signals to generate electrical signals.

The receiver and transmitter are each positioned in an atmosphere with an operational temperature range. For instance, the receiver and transmitter can each be positioned in a different atmosphere and the operational temperature of that atmosphere can vary over a wide range of temperatures. However, the optical components on a transmitter can respond differently to changes in temperature. As a result, a transmitter that functions very well at a temperature where the operational wavelengths of the different components are matched can become highly inefficient at a different temperature. Further, the receivers are associated with the same difficulty.

To make matters worse, the temperature of the atmosphere in which the receiver is positioned can be very different from the temperature of the atmosphere in which the transmitter is positioned. These differences in temperature means that the operational wavelengths of the components on the transmitter have shifted differently than the operational wavelengths of the components on the receiver. As a result, the different temperature of the transmitter and receiver cause further drops in the efficiency of the optical link.

The above problems have been addressed by using a common temperature controller to maintain the transmitter and receiver at a defined temperature. For instance, if the transmitter and receiver are positioned in different atmospheres that each has an operational temperature range of 0-70° C., the transmitter and receiver can be maintained at around 80° C. with the use of heating elements and the operational wavelengths of the components on the transmitter and receiver can be configured to match at 80° C. As a result, the transmitter and receiver efficiently work together at 80° C. and the temperature of the transmitter and receiver does not substantially shift away from 80° C. Alternatively, a TEC (thermo electric cooler) device can be used to maintain the transmitter and receiver at temperatures between 0-70° C., for instance at 55° C. Accordingly, the problems associated with temperature shifts of the transmitter and/or receiver are eliminated. However, the energy requirements needed to keep a transmitter and receiver at these temperature levels are very large and not practical when large numbers of optical links are desired. As a result, there is a need for a more energy efficient optical link.

SUMMARY

An optical system includes a transmitter having multiple laser cavities that each generates an optical channel at a different channel wavelength. The transmitter is configured to modulate the optical channels into modulated light signals. The transmitter is configured to operate in an atmosphere having an operational temperature range that includes a range of temperatures extending from TL to TH. Transmitter electronics are configured to elevate the temperature of the transmitter when the temperature of the atmosphere is in a first portion of the temperature range from TL to TH but not elevate the temperature of the transmitter when the temperature of the atmosphere is in a second portion of the operational temperature range.

In one example, the transmitter electronics elevate the temperature of the transmitter to a temperature above a second temperature in response to a first temperature falling below a temperature threshold. The first temperature is selected from a group consisting of a temperature of the transmitter and a temperature of the atmosphere in which the transmitter is located. The second temperature is greater than or equal to the temperature threshold. The temperature threshold is between TL and TH and is also greater than or equal to TH−(DBW*CS−2*tol)/(dλ/dT) where DBW is a bandwidth percentage of a demultiplexer suitable for demultiplexing the modulated light signals, CS is a wavelength spacing between the channels wavelength, tol is a manufacturing tolerance for the channel laser cavities, and (dλ/dT) represents a shift in a channel wavelength for each optical channel in response to temperature.

Another optical system includes a receiver having a demultiplexer suitable for demultiplexing modulated light signals. The receiver also includes light sensors that each uses one of the demultiplexed light signals to an electrical signal. The receiver is configured to operate in an atmosphere having an operational temperature range that includes a range of temperatures extending from TL to TH. Transmitter electronics are configured to elevate the temperature of the receiver when the temperature of the atmosphere is in a first portion of the temperature range from TL to TH but not elevate the temperature of the transmitter when the temperature of the atmosphere is in a second portion of the temperature range from TL to TH.

One system includes multiple devices that include a transmitter and a receiver. The transmitter is configured to modulate the optical channels into modulated light signals. The system also includes a receiver configured to receive and demultiplex the modulated light signals. At least one of the devices is a controlled device and is selected from a group consisting of the transmitter and receiver. The controlled device is configured to operate in an atmosphere having an operational temperature range that includes a range of temperatures extending from TL to TH. Electronics are configured to elevate the temperature of the controlled device when the temperature of the atmosphere is in a first portion of the temperature range from TL to TH but not elevate the temperature of the controlled device when the temperature of the atmosphere is in a second portion of the operational temperature range.

BRIEF DESCRIPTION OF THE FIGURES

FIG. 6A is a topview of the interface and FIG. 6B is a perspective view of the interface.

FIG. 7A is a bottom view of the laser bar.

FIG. 7B is a cross-section of the laser bar shown in FIG. 7A taken along the line labeled B in FIG. 7A.

FIG. 7C is a cross-section of the laser bar shown in FIG. 7A taken along the line labeled C in FIG. 7A.

FIG. 7D is a topview of the laser bar shown in FIG. 7A.

DESCRIPTION

The inventors have discovered that under certain circumstances, an optical link can maintain a desirable level of efficiency even when the temperature of the transmitter and/or receiver are allowed to shift over particular ranges. As a result, an optical link that is more energy efficient can be achieved by only controlling the temperature of the transmitter and/or receiver over a limited portion of the operational temperature range of the transmitter and/or receiver. For instance, when a common temperature controller is used to control the temperature of a transmitter and the atmosphere in which the transmitter is positioned has a temperature below a threshold temperature, the common temperature controller can be used to heat the transmitter to a temperature above that threshold temperature. However, when the atmosphere in which the transmitter is positioned has a temperature above that threshold temperature, the common temperature controller is not used to heat the transmitter. The temperature threshold can be between the upper and lower limit of the operational range associated with the transmitter. As a result, the common temperature controller is not used when the atmosphere in which the transmitter is positioned is in a portion of the operational range. In this arrangement two different aspects of the common temperature controller requires less energy. First, since the common temperature controller is only used over a portion of the operational range, the common temperature controller is used less frequently than the prior art and accordingly reduces the energy requirement of the optical link. Second, when the common temperature controller is used, it can be used to keep the temperature of the transmitter at a level below the upper limit of the operational range. Since the common temperature controller requires less energy in order to keep the transmitter at a lower temperature, this aspect also and reduces the energy requirement of the optical link.

Figure 1:
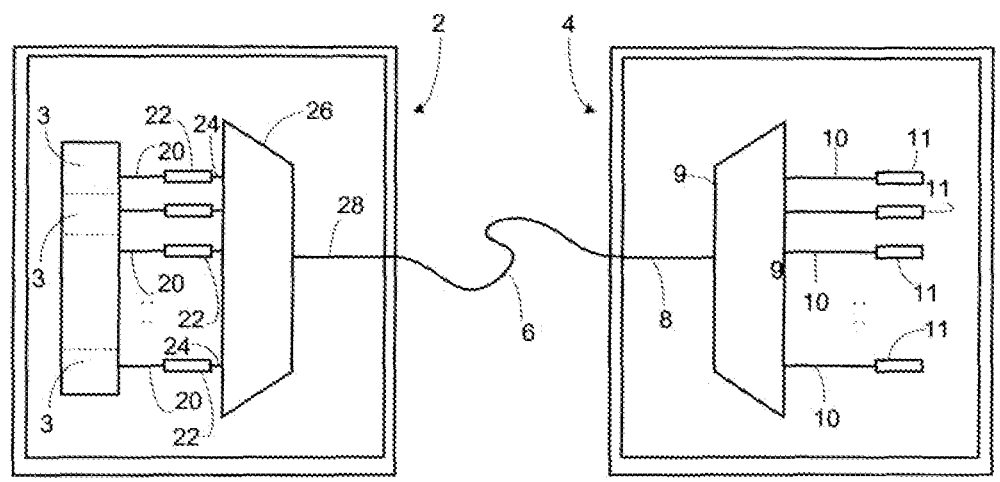
FIG. 1 is a schematic of an optical link.

FIG. 1 is a schematic of a system that includes an optical link. The system includes a transmitter 2 in optical communication with a receiver 4. The transmitter 2 generates an output signal that is received at an interdevice component 6. The interdevice component 6 guides the output signal from the transmitter 2 to the receiver 4. The receiver receives the output signal from the interdevice component 6 and uses it as an input signal. The interdevice components 6 can be component or combination of components that guides the light signal output from the transmitter to the receiver. For instance, the interdevice component 6 can represent something as complex as an optical network or as simple as single optical fiber.

The transmitter 2 shown in FIG. 1 is configured to generate multiple laser signals, modulate them and combine the result into the output signal. The transmitter 2 includes multiple laser cavities 3 that are each configured to output a different wavelength laser signal on a laser waveguide 20. Each laser waveguide 20 guides the received laser signal to a modulator 22. The modulators 22 are configured to be in electrical communication with transmitter electronics (not shown) that can be included on the transmitter and/or external to the transmitter. The transmitter electronics can operate each modulator 22 such that the received laser signal is modulated into a modulated signal. The modulated signals are each received on a modulated waveguide 24 that guides the received modulated signals to a combiner 26 that combines the modulated signals into an output signal that is received on a common waveguide 28. The common waveguide 28 guides the output signal to a facet through which the output signal exits from the transmitter 2.

The receiver 4 shown in FIG. 1 is configured to convert each of the modulated signals received from the transmitter into electrical signals that can be further processed by receiver electronics (not shown) that can be located on the receiver and/or can be external to the receiver. The receiver includes an input waveguide 8 that receives the output signal from the transmitter 2 and uses the received output signal as an input signal. The input waveguide 8 guides the input signal to a demultiplexer 9 that demultiplexes the input signal into sensor signals. The sensor signals are each received on a sensor waveguide 10. Each of the sensor waveguides 10 guides the received sensor signal to a light sensor 11. The light sensors 11 are each in electrical communication with the receiver electronics (not shown). The receiver electronics are configured to operate each light sensor 11 such that the light sensor 11 outputs an electrical signal indicating the presence and/or intensity of the sensor signal received by the light sensor 11. In some instances, the receiver electronics can process the electrical signals so as to extract data that was encoded onto the modulated signals by the modulators. Suitable demultiplexers include, but are not limited to, arrayed waveguide gratings, and echelle gratings.

Figure 2A:
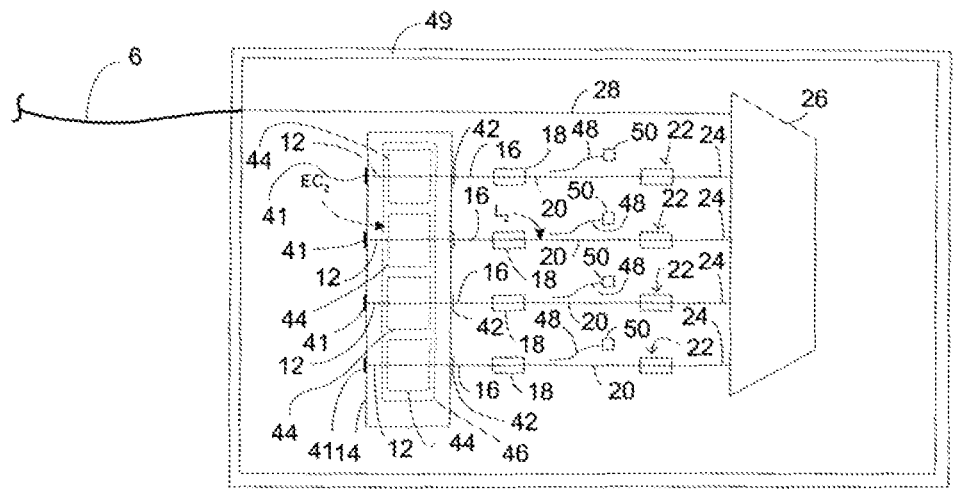
FIG. 2A is a schematic of a transmitter.

FIG. 2A is a schematic of a transmitter that is suitable for use as a transmitter constructed according to FIG. 1. The transmitter includes gain waveguides 12 defined in a gain medium 14. Cavity waveguides 16 each provide an optical pathway from the gain waveguides 12 to a partial return device 18. Laser waveguides 20 each provides an optical pathway from one of the partial return devices 18 to a modulator 22. Modulated waveguides 24 each provides an optical pathway from one of the modulators 22 to a combiner 26. A common waveguide 28 provides an optical pathway from the combiner 26 to a facet located at or near an edge of the transmitter. The transmitter can then be connected to an optical fiber 40 such that the optical fiber 40 receives light guided by the common waveguide 28.

During operation of the transmitter, the cavity waveguides 16 each guides a light signal from the gain medium 14 to the partial return device 18. Each partial return device 18 returns a first portion of the received light signal along its original path and permits a second portion of the light signal to enter the laser waveguide 20. As a result, the second portion of each light signal serves as a laser signal output by a laser cavity.

The cavity waveguides 16 each carries the first portion of the light signal back to one of the gain waveguides 12. The gain waveguides 12 each guides the received first portion of the light signal through the gain medium 14 to a reflector 41. Each reflector 41 reflects the received light signal portion such that the first light signal portion returns to the gain waveguide 12 from which it came. As a result, the reflected light signal portions each eventually return to the partial return device 18 from which it originated. Accordingly, the first light signal portions each travels through a gain waveguide 12 twice before returning to the partial return device 18. Since the partial return device 18 once again returns another portion of the returned first light signal portion, the first portion of the light signal passes through the gain medium 14 multiple times when traveling back and forth between one of the reflectors 41 and the associated partial return device 18. As a result, each reflector 41 and the associated partial return device 18 define one of the laser cavities on the transmitter.

While the first portion of the light signal is making multiple passes through the gain medium 14, energy is applied to the gain medium 14 so as to provide the optical gain needed to cause lasing within the gain medium. In some instance, the energy is electrical energy provided by the transmitter electronics but other forms of energy can be used. The reflectors 41 can each be highly reflective so substantially all of the first light signal portions are returned to one of the gain waveguides 12.

The partial return devices 18 can be wavelength dependent in that the partial return devices 18 each returns to the gain medium 14 only particular wavelengths of light while transmitting all other wavelengths. Only the wavelengths returned to the gain medium 14 lase. Accordingly, the selection of wavelengths in each laser signal (the second portion of the light signal that passes the partial return device 18) are in the range of wavelengths returned by the partial return device 18 from which the laser signal exits. Additionally, different partial return devices 18 can be configured to return a different range of wavelengths. As a result, each of the different laser signals can include a different range of wavelengths. When the range of wavelengths returned by each of the partial return devices 18 is narrow, each of the different laser signals can be at a different wavelength or can include a different channel at a different channel wavelength. An example of partial return devices 18 that can each return light in a range of wavelengths while transmitting light of other wavelengths are reflective optical gratings such as Bragg gratings.

The laser waveguides 20 each guide one of the laser signals to a modulator 22. Transmitter electronics (not shown) can operate the modulator 22 so as to modulate the laser signals. For instance, the transmitter electronics can encode data onto one or more of the laser signals. The modulated waveguides 24 each carries one of the modulated signals to the combiner 26. The combiner 26 combines the received light signals into an output signal received by the common waveguide 28.

The common waveguide 28 guides the output signal to the facet. Accordingly, when an optical fiber 40 is aligned with the facet 41, the optical fiber 40 receives the amplified light signal from the common waveguide 28.

FIG. 2A includes dashed lines showing the location of multiple first electrical conductors 44 and a common electrical contact 46. The first electrical conductors 44 and the common electrical contacts 46 are each in electrical communication with the gain medium 14 and can each be in direct physical contact with the gain medium 14. Additionally, the gain medium 14 can be between first electrical conductors 44 and the common electrical contact 46. Transmitter electronics (not shown) can be in electrical communication with the first electrical conductors 44 and the common electrical contact 46 and can be configured to use these electrical contacts to apply electrical energy to the gain medium 14.

Four laser cavities are shown in FIG. 2A although the transmitter can include more or less than four lasers. As is evident from FIG. 2A, each of the first electrical conductors 44 is associated with one of the laser cavities. As a result, the transmitter electronics can apply electrical energy to the gain medium 14 associated with a particular one of the laser cavities and accordingly increase or decrease the intensity of the laser signal produced by that laser cavity. For instance, the transmitter electronics can increase the electrical energy applied between the common electrical contact 46 and the first electrical conductor 44 labeled $EC_2$ in FIG. 2A in order to increase the intensity of the laser signal labeled $L_2$ in FIG. 2A.

In some instances, the transmitter includes one or more coupled waveguides 48 that are each optically coupled with the laser waveguide 20 such that a portion of the laser signal guided by the optically coupled laser waveguide 20 is coupled into the coupled waveguide 48. The coupled waveguide 48 guides the tapped portion of the laser signal to a light sensor 50. Each of the light sensors 50 is configured to convert the received light signal to an electrical signal. The transmitter electronics can be in electrical communication with the light sensor 50 and can receive the electrical signal from the light sensor 50.

During operation of a transmitter that includes coupled waveguides 48, the transmitter electronics receive the electrical signal from the light sensor 50. The transmitter electronics can also adjust the level of electrical energy applied to each of the lasers in response to the electrical signal received from the light sensor 50 associated with that laser in a feedback loop. For instance, in the event that the electrical signal from one of the light sensors 50 indicates that the intensity of the laser signal being received by the light sensor 50 is above a threshold, the transmitter electronics can reduce the electrical energy applied to the gain medium 14 associated with the laser that produced the laser signal in order to reduce the intensity of the laser signal received by that light sensor 50.

Figure 2B:
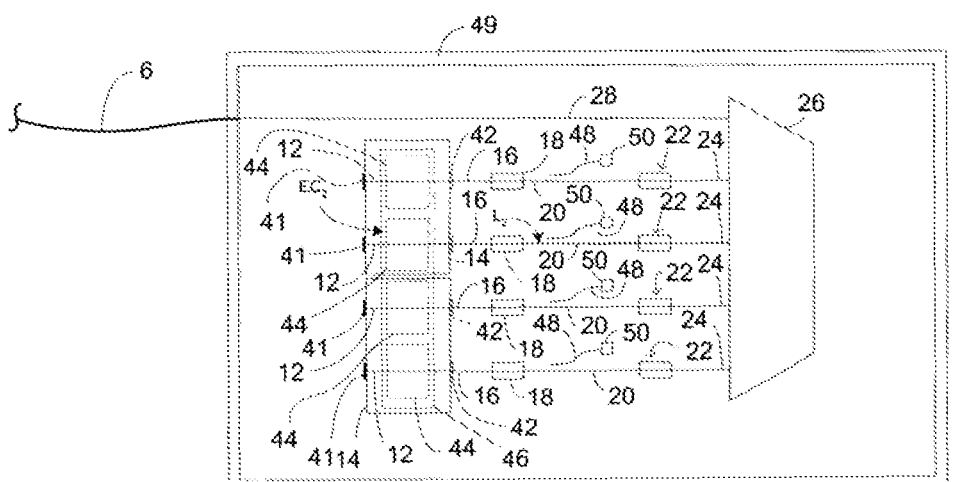
FIG. 2B is another schematic of a transmitter.

Although FIG. 2A shows each of the lasers using the same gain medium 14, different lasers can employ different gain media. For instance, FIG. 2B shows the transmitter of FIG. 2A but two of the laser cavities use a different gain medium 14 than the other two laser cavities. Such an arrangement may be suitable for instances where it is desirable to create laser signals of different wavelengths with different gain media. For instance, when the wavelength differential between adjacent channel wavelengths (the channel spacing) is sufficiently large that one gain medium does not efficiently generate each of the channels, it may be desirable to use different gain media to generate different laser signals so that different laser cavities can each be matched to a gain medium that efficiently generates the wavelength of laser signal associated with that laser cavity.

Figure 3:
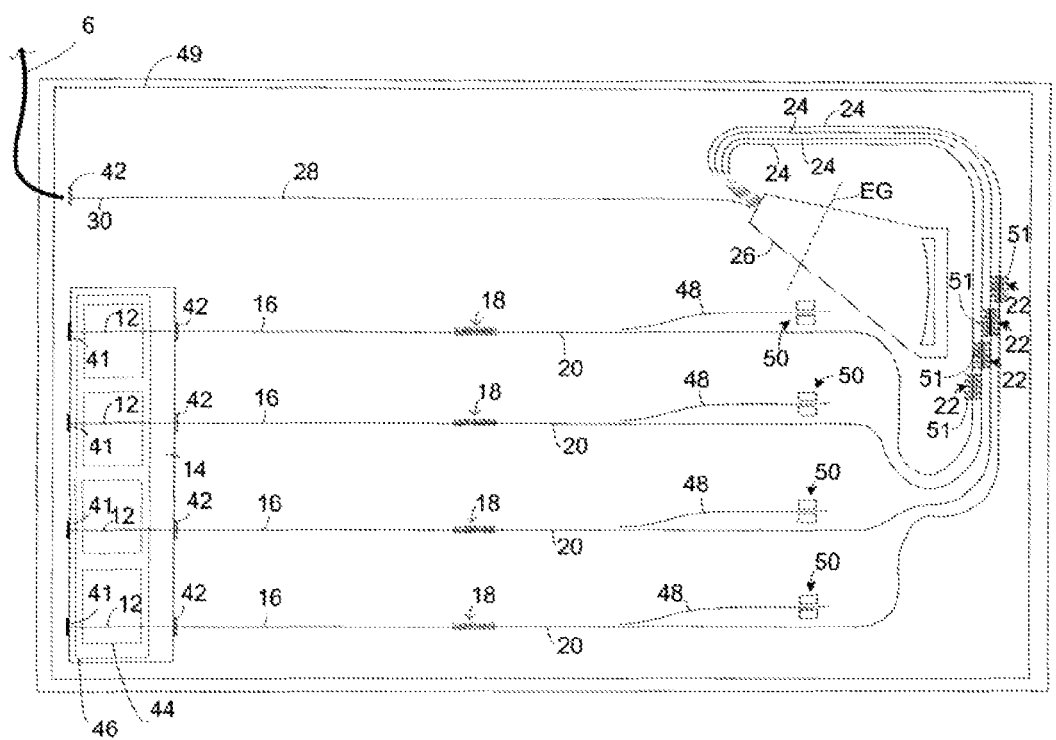
FIG. 3 is a topview of a transmitter constructed according to FIG. 2A.

FIG. 3 is a topview of a transmitter constructed according to FIG. 2A. The transmitter is built on a silicon-on-insulator wafer although other platforms are possible. The transmitter employs a Bragg grating as the partial return device 18 and an echelle grating as the combiner 26. The common waveguide 28 guides the amplified light signal to an optical fiber 40. The optical fiber 40 can be glued to the transmitter.

Additional information regarding the structure, construction, fabrication, and/or operation of the above transmitters and other transmitters that are suitable for use in the optical link can be found in U.S. patent application Ser. No. 13/317, 340, filed on Oct. 14, 2011, entitled "Gain Medium Providing Laser and Amplifier Functionality to Optical Device," incorporated herein in its entirety, and also in U.S. patent application Ser. No. 13/385,780, filed on Mar. 5, 2012, entitled "High Speed Optical Transmitter Producing Modulated Light Signals," incorporated herein in its entirety.

Figure 4:
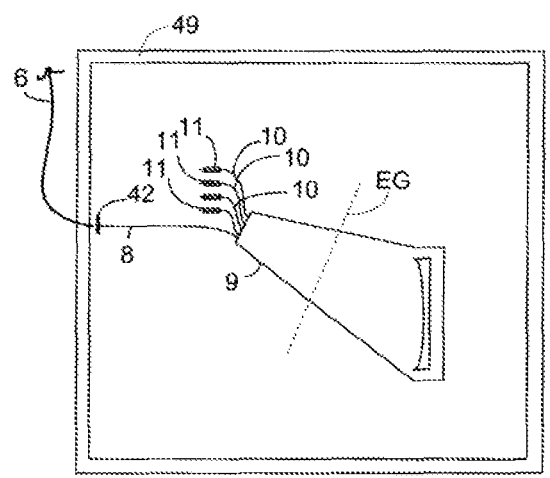
FIG. 4 is a topview of a receiver constructed according to FIG. 1.

FIG. 4 is a topview of a receiver constructed according to FIG. 2A. The receiver is built on a silicon-on-insulator wafer although other platforms are possible. An optical fiber serves as the interdevice component 6. The receiver employs an echelle grating as the demultiplexer.

The above transmitter and/or receivers can optionally include secondary components in addition to the illustrated components. Examples of suitable secondary components include, but are not limited to, facets through which light signals can enter and/or exit a waveguide, a taper for changing the mode size of a light signal guide by one or more of waveguides, entry/exit ports through which light signals can enter and/or exit a waveguide from above or below the device, multiplexers for combining multiple light signals onto a single waveguide, demultiplexers for separating multiple light signals such that different light signals are received on different waveguides, optical couplers, optical switches, lasers that act a source of a light signal, light sensors such as sensors that convert all or a portion of the light signal to an electrical signal, amplifiers for amplifying the intensity of a light signal, attenuators for attenuating the intensity of a light signal, modulators for modulating a signal onto a light signal, modulators that convert a light signal to an electrical signal, and vias that provide an optical pathway from the bottom side of a device to the top side of the device. Although not illustrated, the devices can optionally include electrical devices.

Another example of secondary components that can be included on the transmitter and/or receiver is a localized temperature control device. Localized temperature control devices are designed to control the temperature of a temperature sensitive component on the device (transmitter or receiver) rather than attempting to control the temperature of the entire device. For instance, a localized temperature control device may be configured to control the temperature of a single component such as a laser cavity, a modulator, a light sensor, combiner, or demultiplexer. As an example, the transmitter of FIG. 3 shows several different dashed lines that each represents a localized heater 51. The localized heaters 51 are each associated with a modulator in that the heat provided by the localized heaters 51 is intended to elevate the temperature of the associated modulator without substantially elevating the temperature of another one of the modulators. Because it is often not possible or desirable to place a localized heater 51 directly in contact with the associated component, the localized heater(s) 51 must be close enough that the zone where the temperature is increased extends beyond the components. Accordingly, the localized heaters 51 shown in FIG. 3 are positioned on opposing sides of the associated modulator rather than directly in contact with the associated modulator.

The device can also include one or more temperature sensors (not shown) that are each positioned to sense the temperature of the temperature sensitive component itself and/or the temperature of a zone adjacent to the temperature sensitive component. For instance, the transmitter of FIG. 3 can include one or more temperature sensors (not shown) that are each positioned to sense the temperature of one of the modulators and/or the temperature of a zone adjacent to one of the modulators.

Electronics (not shown) can operate the one or more localized temperature control devices and receive output from the one or more temperature sensors. The electronics can also adjust the level of electrical energy applied to each of the localized temperature control devices in response to the output received from the one or more temperature sensors in a feedback loop. For instance, in the event that the output from the one or more temperature sensors indicates that the temperature of a component is below a lower threshold, the electronics can increase the heat being generated by associated localized temperature control devices to increase the temperature of the associated component. Additionally or alternately, in the event that the output from the one or more temperature sensors indicates that the temperature of is above an upper threshold, the electronics can decrease the level of heat being generated by the one or more localized temperature control devices associated with that component.

In the example of FIG. 3, one or more localized heaters 51 can be associated with all or a portion of the modulators and the electronics can be configured to control the temperature of each modulator so as to control the wavelength that the modulator modulates most efficiently (the modulation wavelength). For instance, each of the modulators 22 can have the same structure and accordingly the same modulation wavelength. However, the laser signals each has a different wavelength. As a result, at least a portion of the modulators are modulating laser signals at a wavelength other than the modulation wavelength and are accordingly not operating at optimal efficiency. The modulation wavelength of a modulator can be shifted by changing the temperature of the modulator. As a result, the electronics can operate the localized heaters 51 so that the modulation wavelength of each modulator approximates the wavelength of the laser signal modulated by that modulator.

Suitable localized heaters for use on planar optical devices 2 include, but are not limited to, resistive heating elements. For instance, a suitable localized heater can be a layer of electrically conducting material with a temperature that increases in response to the electronics applying an electrical current across the material. Suitable temperature sensors include, but are not limited to, thermocouples, thermistors, resistive thermal devices (RTDs), and semiconductor temperature sensors. Although the localized temperature control devices are disclosed as controlling temperature by the output of heat, suitable temperature control devices can additionally or alternately be configured to control temperature by cooling.

As will be discussed in more detail below, the use of localized heaters on the transmitter is optional.

The transmitter and receiver illustrated above are positioned on a common temperature controller 49. A common temperature controller 49 is configured to control the temperature of the transmitter or receiver. For instance, the common temperature controller 49 is configured to heat and/or cool more than one of the components on the transmitter or receiver. As an example, a common temperature controller 49 for a transmitter is configured to heat and/or cool at least two components selected from the group consisting of the laser cavities, modulators, and combiner. In some instances, the common temperature controller 49 for a transmitter is configured to heat and/or cool the laser cavities, modulators, and combiner or to heat and/or cool the entire transmitter. In some instances, a common temperature controller 49 for a receiver is configured to heat and/or cool at least the demultiplexer and the light sensors or to heat and/or cool the entire transmitter.

As noted above, the transmitter and/or receiver can include one or more localized temperature control devices. The transmitter and/or receiver can include the one or more localized temperature control devices in addition to the common temperature controller 49. In these instances, the temperature across the transmitter and/or receiver is not uniform. The electronics on the transmitter (transmitter electronics) and/or receiver (receiver electronics) can be in electrical communication with one or more common temperature sensors (not shown) that are each positioned to sense the temperature of the device (transmitter or receiver). The one or more common temperature sensors can be positioned outside the zone where any localized temperature control devices substantially affect the temperature of the device. As a result, the output of the one or more common temperature sensors indicates the temperature across the device rather than a temperature that characterizes a localized zone on the device. As will be described in more detail below, the electronics can operate the common temperature controller 49 in response to output from the one or more common temperature sensors. Suitable common temperature sensors include, but are not limited to, thermocouples, thermistors, resistive thermal devices (RTDs), and semiconductor temperature sensors.

As will become evident below, the common temperature controller 49 is optional. In some instances, the receiver and/or transmitter need not include a common temperature controller 49. In addition to the common temperature controller 49 or as an alternative to the common temperature controller, the receiver and/or transmitter can include zone definers (not illustrated) and/or heat sinks (not illustrated) as disclosed in U.S. patent application Ser. No. 13/507,491, filed on Jul. 3, 2012, entitled "System for Managing Thermal Conduction on Optical Devices," and incorporated herein in its entirety. Suitable common temperature controllers include, but are not limited to, thermoelectric coolers (TEC). TECs have the ability to both cool and heat the device. However, common temperature controllers that have only the ability to heat or only the ability to cool can be employed. Although the above discussion discloses a single common temperature controller on each device, multiple common temperature controllers can be used with a single device.

Figure 5A:
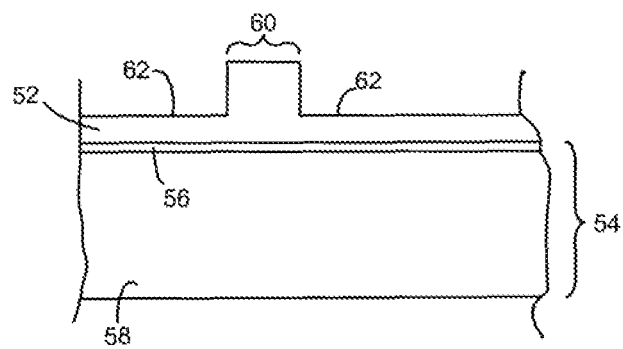
FIG. 5A is a cross-section of a waveguide constructed on a silicon-on-insulator wafer.

FIG. 5A illustrates a suitable construction for waveguides on the transmitter of FIG. 1 through FIG. 3 and/or for the waveguides on the receiver of FIG. 4. FIG. 5A is a cross section of a waveguide on the device. For instance, FIG. 5A can be a cross-section of the input waveguide 8, sensor waveguides 10, cavity waveguides 16, the laser waveguides 20, modulated waveguides 24, common waveguide 28, and/or coupled waveguides 48. In one example of the transmitter, each of the cavity waveguides 16, the laser waveguides 20, modulated waveguides 24, common waveguide 28, and/or coupled waveguides 48 is constructed according to FIG. 5A. In one example of the receiver, the input waveguide 8 and each of the sensor waveguides 10 is constructed according to FIG. 5A.

The device of FIG. 5A includes a light-transmitting medium 52 on a base 54 that includes an optical insulator 56 positioned on a substrate 58. Suitable light-transmitting media include, but are not limited to, silicon, polymers, silica, SiN, GaAs, InP and LiNbO$_3$.

The waveguide is partially defined by a ridge 60 of the light-transmitting medium 52 extending outward from slab regions 62 of the light-transmitting medium 52. The ridge 60 and the base 54 together define a portion of the light signal-carrying region where light signals are constrained within the waveguide. For instance, the ridge 60 of light-transmitting medium 52 can optionally include a cladding (not shown) with an index of refraction that is less than the index of refraction of the light-transmitting medium 52. Likewise, the optical insulator 56 can have an index of refraction that is less than an index of refraction of the light-transmitting medium 52. The drops in index of refraction causes light signals being carried within the light signal-carrying region to be reflected back into the light signal-carrying region. Accordingly, the light signal is constrained between the ridge 60 and the optical insulator 56. Suitable claddings include, but are not limited to, silicon nitride (SiN) and silica (SiO2) and can include one layer or more than one layer of material.

A suitable platform having a structure according to FIG. 5A is a silicon-on-insulator wafer although other platforms can be used. A silicon-on-insulator wafer includes a silicon layer positioned on a base. The silicon layer serves as the light-transmitting medium 52 through which light signals are guided. The base includes a layer silica positioned on a silicon substrate. The layer of silica can serve as the optical insulator 56 and the silicon substrate can serve as the substrate 58.

Figure 5B:
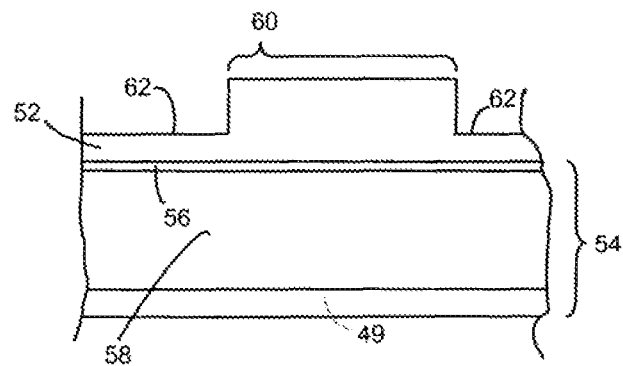
FIG. 5B is a cross-section of an echelle grating constructed on a silicon-on-insulator wafer.

Suitable combiners 26 for use with the transmitter can be wavelength dependent multiplexers such as echelle gratings or arrayed waveguide gratings. Suitable demultiplexers for use in the receiver can be echelle gratings or arrayed waveguide gratings. The structure of FIG. 5A can be adapted so it also serves as an echelle grating. For instance, FIG. 5B illustrates the ridge 60 of FIG. 5A with sufficient width to serves as the free space region of an echelle grating. Accordingly, the cross-section of FIG. 5B can serves as a cross section of the combiner in the transmitter of FIG. 3 taken along the line labeled EG and/or as a cross section of the demultiplexer in the receiver of FIG. 4 taken along the line labeled EG.

Suitable echelle grating structures and/or methods of fabricating echelle gratings on a silicon-on-insulator wafer are disclosed in U.S. patent application Ser. No. 12/800,600, filed on May 18, 2010, and entitled "Extension of Steps in Reflective Optical Gratings;" and also in U.S. Provisional Patent Application Ser. No. 61/284,723, filed on Dec. 23, 2009, and entitled "Reducing Optical Loss in Reflective Optical Gratings;" and also in U.S. patent application Ser. No. 12/927,412, filed on Nov. 12, 2010, and entitled "Reducing Optical Loss in Reflective Optical Gratings;" and also in U.S. patent application Ser. No. 12/321,386, filed on Jan. 16, 2009, and entitled "Optical Component Having Features Extending Different Depths into a Light Transmitting Medium," each of which is incorporated herein in its entirety. The echelle grating structures, methods of echelle grating fabrication, and/or operation disclosed in these patent applications can be employed in the combiner 26 of a transmitter constructed according to FIG. 1 through FIG. 3 or in the demultiplexer of a receiver constructed according to FIG. 1 or FIG. 4.

In some instances, the combiner 26 can be a wavelength independent combiner such as combiners that employ waveguides that intersect one another so as to combine light signals from different waveguides. Wavelength dependent multiplexers can become more desirable than wavelength independent combiners as the number of light signals that are combined by the combiner 26 increases. The optical loss associated with combiners increases as the numbers of light signals that must be combined increases. In some instances, the amount of optical loss is stronger in wavelength independent combiners than in wavelength dependent multiplexers. Accordingly, the use of wavelength dependent multiplexers may become more desirable as the number of light signals combined by the combiner 26 increases.

An example of a suitable wavelength independent combiner that employ one or more y-junctions is disclosed in U.S. patent application Ser. No. 10/644,395, filed on Aug. 19, 2003, and entitled "Multiplexer Having Improved Efficiency," and now U.S. Pat. No. 7,805,037; and also in U.S. Provisional patent application Ser. No. 10/600,748, filed on Jun. 20, 2003, and entitled "Multiplexer Having Improved Efficiency," each of which is incorporated herein in its entirety. The y-junction structures and/or methods of fabrication disclosed in these patent applications can modified to employ single mode waveguides or multimode waveguides and can be employed as the combiner in the transmitter of a device constructed according to FIG. 1 through FIG. 3.

Figure 6A:
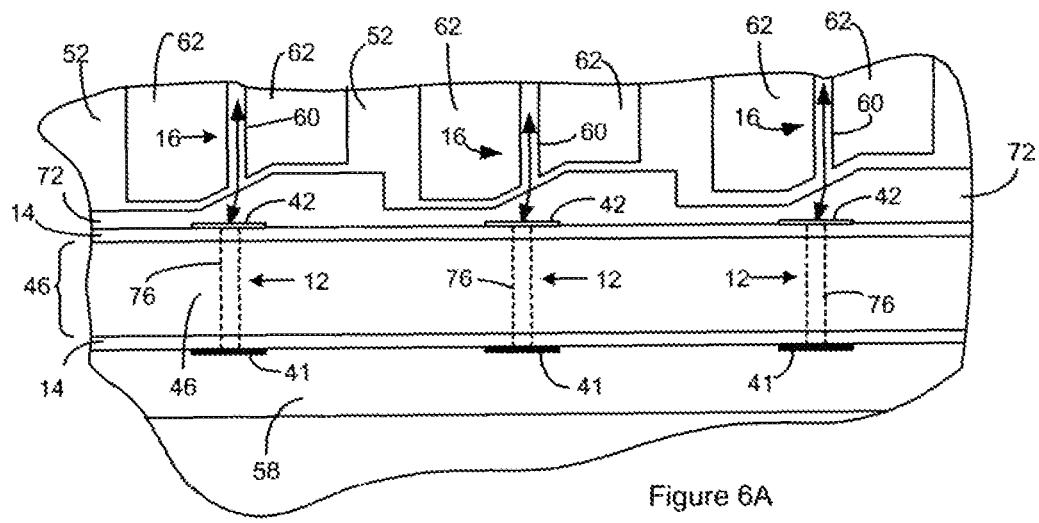
FIG. 6A through FIG. 6B illustrate a suitable interface between a transmitter and a laser bar.
Figure 6B:
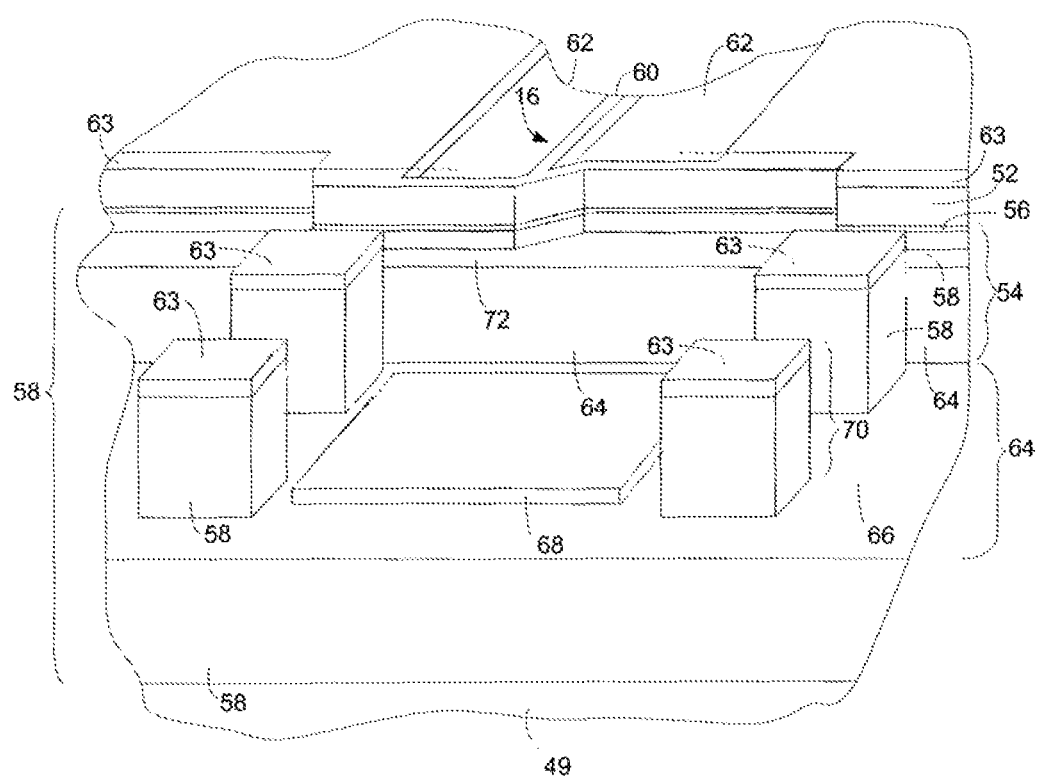

The gain media illustrated in FIG. 1 through FIG. 3 can be included in a laser bar. FIG. 6A through FIG. 6B illustrate a suitable interface between an optical device and a laser bar that includes the gain medium 14. FIG. 6A is a topview of the optical device.

The portion of the device illustrated in FIG. 6A includes the gain waveguides 12. Since a ridge 76 for the gain waveguides 12 is on a bottom side of the laser bar and FIG. 6A is a topview, the location of the ridge 76 for the gain waveguides 12 is shown by dashed lines.

The portion of the device illustrated in FIG. 6A also includes cavity waveguides 16 that each receives the first portion of a light signal from a different gain waveguide 12 on the laser bar. The light signals each enter and exit the cavity waveguides 16 through a facet. As evident from FIG. 6A, the facet can be angled at less than 90° relative to the direction of propagation through the cavity waveguide 16 at the facet. The angle can reduce performance reduction associated with back reflection.

The side of the gain medium 14 at which the first portion of the light signal is reflected includes a material that serves as the reflector 41. A suitable material for forming the reflector 41 includes, but is not limited to, a layer of metal on the layer of gain medium 14. The side of the gain medium 14 through which the first portion of the light signal is transmitted includes an anti-reflective coating 42. A material that serves as a suitable anti-reflective coatings 42 includes, but is not limited to, single-layer coatings such as silicon nitride or aluminum oxide, or multilayer coatings which may contain silicon nitride, aluminum oxide, and/or silica.

FIG. 6B is a perspective view of a portion of the optical device shown in FIG. 6A. The illustrated portion of the optical device is suitable for interfacing with one of the lasers on the laser bar or with the amplifier on the laser bar. The laser bar is not illustrated in FIG. 6B in order to make the portion of the optical device under the laser bar visible. A cladding 63 is shown on the light-transmitting medium 52. While the cladding 63 is present over the waveguides and in the trenches, the cladding 63 is not shown in these locations in order to make certain features of the optical device readily visible.

A recess 64 extends into the base 54 to form a laser bar platform 66. Contact pads 68 positioned on the laser bar platform 66 can be employed for providing electrical communication with a laser on the laser bar or with the amplifier on the laser bar. One or more stops 70 extend upward from the laser bar platform 66. For instance, FIG. 6B illustrates four stops 70 extending upward from the laser bar platform 66. The stops 70 include the cladding 63 positioned on a base portion. The substrate 58 can serve as the base portion of the stops 70 and the stop 70 can exclude the light insulator 56 or be made of the same material as the light insulator 56. The portion of the substrate 58 included in the stops 70 can extend from the platform up to the level of the light insulator 56. For instance, the stops 70 can be formed by etching through the light insulator 56 and using the underlying substrate 58 as an etch-stop. The cladding 63 can then be formed on the first light-transmitting medium 52 at the same time the cladding 63 is formed on the base portion of the stops 70.

A secondary platform 72 can optionally be positioned between the facet of the cavity waveguides 16 and the laser bar platform 66. The secondary platform 72 is elevated relative to the laser bar platform 66. For instance, the secondary platform 72 can be above the laser bar platform 66 and at or below the level of the light insulator 56. The secondary platform 72 can essentially be the top of the substrate 58 or the secondary platform 72 can be positioned below the level of the light insulator 56 as illustrated in FIG. 6B. Alternately, the secondary platform 72 can be etched concurrently with the base portion of the stops 70 resulting in the secondary platform 72 and the base portion of the stops 70 having about the same height above the laser bar platform 66. Alternately, the secondary platform 72 may not be present at all. For instance, the portion of the base 54 between the laser bar platform 66 and the waveguide facet can be substantially vertical relative to the laser bar platform 66.

The optical device includes one or more alignment marks (not shown). Suitable marks include recesses that extend into the optical device. An alignment recess can extend into the first light-transmitting medium 52 and/or the base 54. In some instances, one or more of the alignment recesses extend into the secondary platform 72. During attachment of the laser bar to the optical device, the alignment recesses can be aligned with secondary alignment recesses (not shown) on the laser bar in order to achieve horizontal alignment of the laser bar relative to the optical device.

Figure 7A:
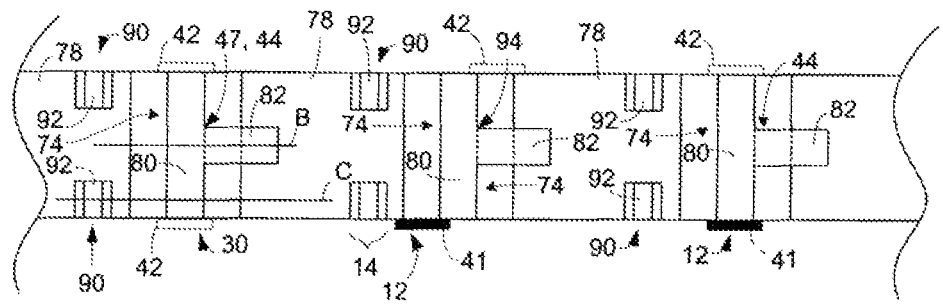
FIG. 7A through FIG. 7D illustrate a laser bar that is suitable for use with a transmitter constructed according to FIG. 6A through FIG. 6B.
Figure 7B:
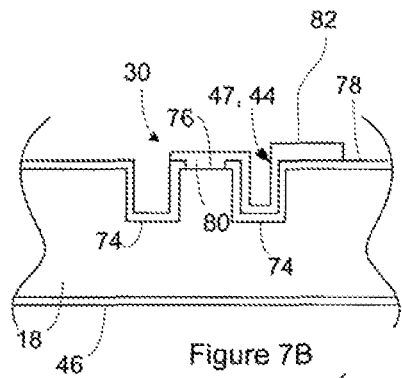
Figure 7C:
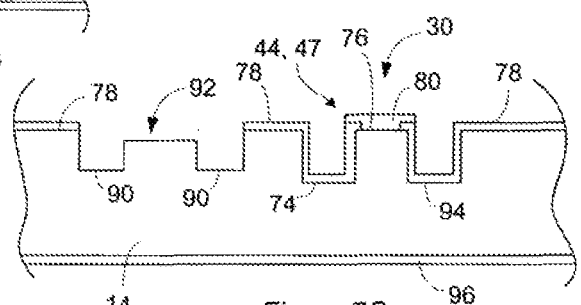
Figure 7D:
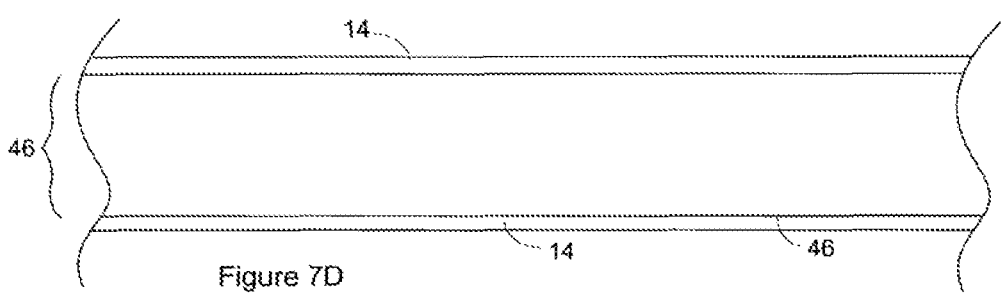

FIG. 7A through FIG. 7D illustrate a laser bar that is suitable for use with an optical device constructed according to FIG. 6A through FIG. 6B. FIG. 7A is a bottom view of the laser bar. FIG. 7B is a cross-section of the laser bar shown in FIG. 7A taken along the line labeled B in FIG. 7A. FIG. 7C is a cross-section of the laser bar shown in FIG. 7A taken along the line labeled C in FIG. 7A. FIG. 7D is a topview of the laser bar. The laser bar includes waveguides defined in the gain medium 14 for multiple lasers and an amplifier. Trenches 74 extending into the gain medium 14 define ridges 76 in the gain medium 14. The ridges 76 each defines a first amplifier waveguide 30 or one of the gain waveguides 12. Suitable gain media include, but are not limited to, InP, InGaAsP, and GaAs.

A laser bar cladding 78 is positioned on the gain medium 14. A first electrical conductor 44 positioned on the cladding 78 includes a contact region 80 that extends through an opening in the laser cladding 78 into contact with a top of the ridge 76. The first electrical conductor 44 extends from the contact region 80 across a trench 74 to a contact pad 82. The contact pad 82 can be employed to apply electrical energy to the laser. One of the illustrated first electrical conductors 44 can also serve as the amplifier electrical contact 47.

One or more alignment trenches 90 are positioned between adjacent ridges 76. For instance, FIG. 7A illustrates two alignment trenches 90 between adjacent ridges 76 and positioned on opposing sides of the laser bar. A secondary stop 92 extends upward from the bottom of the alignment trench.

Although FIG. 7A through FIG. 7D illustrate a secondary stop 92 extending upward from a bottom of the alignment trench such that walls of the secondary stop are spaced apart from walls of the alignment trench, the bottom of the alignment trench can be substantially flat. However, an embodiment having walls of the secondary stop spaced apart from walls of the alignment trench may be preferred to reduce etch induced inconsistencies on the tops of the secondary stops.

The common electrical contact 46 is positioned under the gain medium 14. The common electrical contact 46 can be used as a ground for each of the lasers when applying electrical energy to a laser and also for the amplifier when applying electrical energy to the amplifier.

Figure 8A:
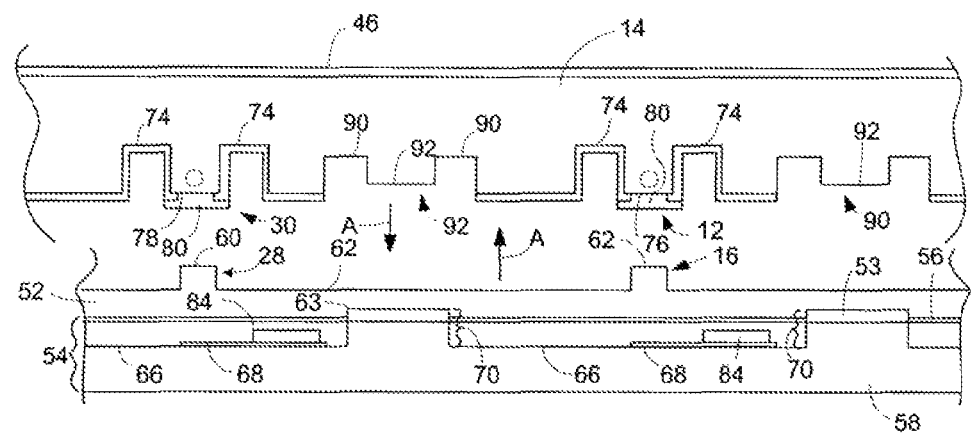
FIG. 8A illustrates assembly of a system using a transmitter constructed according to FIG. 6A through FIG. 6B and a laser bar constructed according to FIG. 7A through FIG. 7D.

FIG. 8A illustrates assembly of the optical system using an optical device constructed according to FIG. 6A through FIG. 6B and a laser bar constructed according to FIG. 7A through FIG. 7D. The optical device illustrated in FIG. 8A does not show either a cross-sectional view or a sideview. Instead, the view of the optical device shows the relative positions of different features of the optical device when looking at a sideview of the optical device. In contrast, the laser bar illustrated in FIG. 8A is a cross-sectional view of the laser bar such as the cross section of FIG. 7C.

The device can be assembled by moving the optical device and the laser bar toward one another as indicated by the arrows labeled A. Each of the stops 70 on the optical device is aligned with one of the secondary stops on the laser bar.

FIG. 8A shows solder pads 84 positioned on the contact pads 68 on the laser bar platforms 66. The solder pads 84 can be used to immobilize the laser bar relative to the optical device once the laser bar is positioned on the optical device. The solder pads 84 can also provide electrical communication between the contact pads 68 on the laser platform and the contact pads 82 on the laser bar. Accordingly, the transmitter electronics are in electrical communication with the common electrical contact 46 and each of the contact pads 68 on the laser platform. The transmitter electronics can apply electrical energy to each of the lasers and/or the amplifier by applying electrical energy across the associated contact pad 68 and the common electrical contact 46.

Figure 8B:
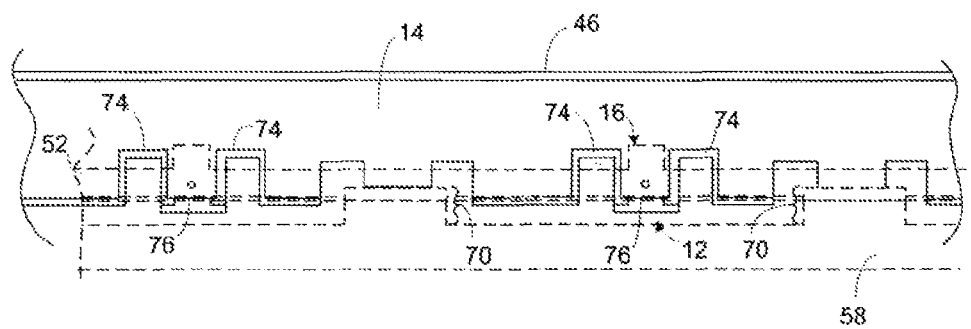
FIG. 8B illustrates the transmitter as shown in FIG. 8A and the laser bar as shown in FIG. 8A assembled in an optical assembly according to FIG. 6A.

FIG. 8B illustrates the optical device as shown in FIG. 8A and the laser bar as shown in FIG. 8A assembled in an optical assembly according to FIG. 6A. For the purposes of clarity, the optical device is shown by the dashed lines while the laser bar is shown by solid lines. The solder pads 84 are also removed from this illustration. Each of the stops 70 on the optical device meets one of the secondary stops on the laser bar. As a result, the vertical movement of the optical device and the laser bar toward one another is limited by the stops 70 butting against the secondary stops.

In FIG. 8A, circles show the mode of the first light signal portion in the gain waveguides 12 and also in the mode of the amplified light signal in the first amplifier waveguide 30. As is evident from FIG. 8B, the modes are each aligned with the facets of a cavity waveguide 16 or the output waveguide 36.

Additional details regarding the fabrication, structure, and/or alignment of a laser bar with an optical device as shown in FIG. 6A through FIG. 8B can be found in U.S. patent application Ser. No. 12/215,693, filed on Jun. 28, 2008, granted U.S. Pat. No. 7,658,552, entitled "Interface Between Light Source and Optical Component, and incorporated herein in its entirety.

Figure 9:
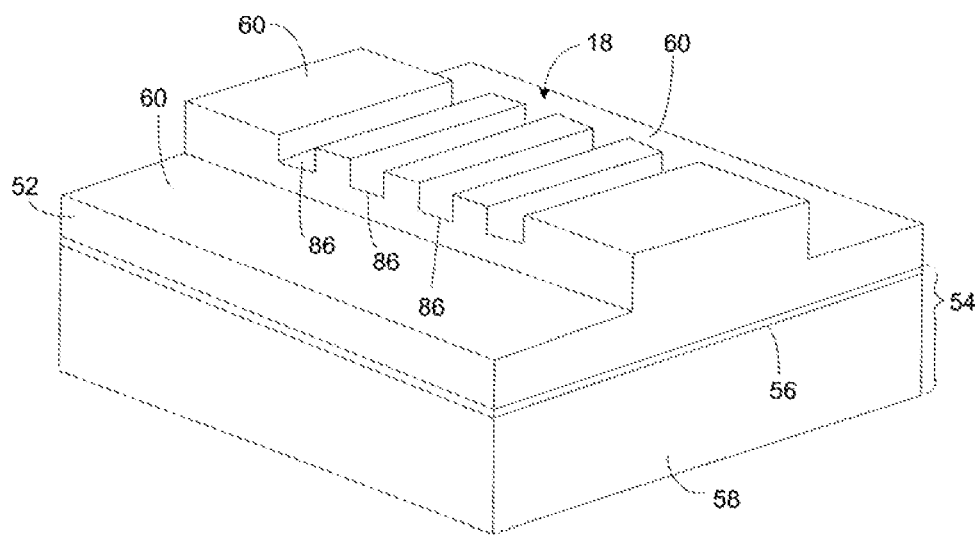
FIG. 9 is a perspective view of a portion of a device that includes a Bragg grating constructed on a silicon-on-insulator wafer.

Suitable partial return devices 18 include, but are not limited to, a reflective optical grating such as a Bragg grating. FIG. 9 is a perspective view of a portion of the device that includes a Bragg grating constructed on a silicon-on-insulator wafer. Recesses 86 extend into the top of the ridge 60 of the waveguide. The recesses 86 are filled with a medium having a lower index of refraction than the light-transmitting medium 52. The medium can be a solid or a gas such as air. Accordingly, the recesses 86 provide the variations in the index of refraction of the waveguide that allow the recesses 86 to act as a Bragg grating. The Bragg grating is illustrated with only four recesses 86 in order to simplify the illustration. However, the Bragg grating can include more than four recesses 86. The recesses 86 are arranged so as to form a periodic pattern in the ridge 60. The range of wavelengths reflected by a Bragg grating can be altered by changing the depth and/or period of the grooves as well as other variables. Accordingly, each of the laser cavities can include a Bragg grating configured to reflect a different range of wavelengths.

Additional information regarding the structure, construction, fabrication, and/or operation of the above laser cavities and/or partial return devices and/or Bragg Gratings that are suitable for use in the optical link can be found in U.S. patent application Ser. No. 13/573,892, filed on Oct. 12, 2012, entitled "Reduction of Mode Hopping in a Laser Cavity," and incorporated herein in its entirety.

The modulators 22 are preferably each an intensity modulator 22 but can be other modulators 22 such as phase modulators 22. A variety of different modulator 22 constructions are suitable for use with waveguides on a silicon-on-insulator platform. In some instances, the modulators 22 are constructed and operated as shown in U.S. patent application Ser. No. 11/146,898; filed on Jun. 7, 2005; entitled "High Speed Optical Phase Modulator," and now U.S. Pat. No. 7,394,948; or as disclosed in U.S. patent application Ser. No. 11/147,403; filed on Jun. 7, 2005; entitled "High Speed Optical Intensity Modulator," and now U.S. Pat. No. 7,394,949; or as disclosed in U.S. patent application Ser. No. 12/154,435; filed on May 21, 2008; entitled "High Speed Optical Phase Modulator," and now U.S. Pat. No. 7,652,630; or as disclosed in U.S. patent application Ser. No. 12/319,718; filed on Jan. 8, 2009; and entitled "High Speed Optical Modulator;" or as disclosed in U.S. patent application Ser. No. 12/928,076; filed on Dec. 1, 2010; and entitled "Ring Resonator with Wavelength Selectivity;" or as disclosed in U.S. patent application Ser. No. 12/228,671, filed on Aug. 13, 2008, and entitled "Electrooptic Silicon Modulator with Enhanced Bandwidth;" or as disclosed in U.S. patent application Ser. No. 12/653,547, filed on Dec. 15, 2009, and entitled "Optical Device Having Modulator Employing Horizontal Electrical Field;" or as disclosed in U.S. patent application Ser. No. 12/660,149, filed on Feb. 19, 2010, and entitled "Reducing Optical Loss in Optical Modulator Using Depletion Region;" each of which is incorporated herein in its entirety.

Figure 10:
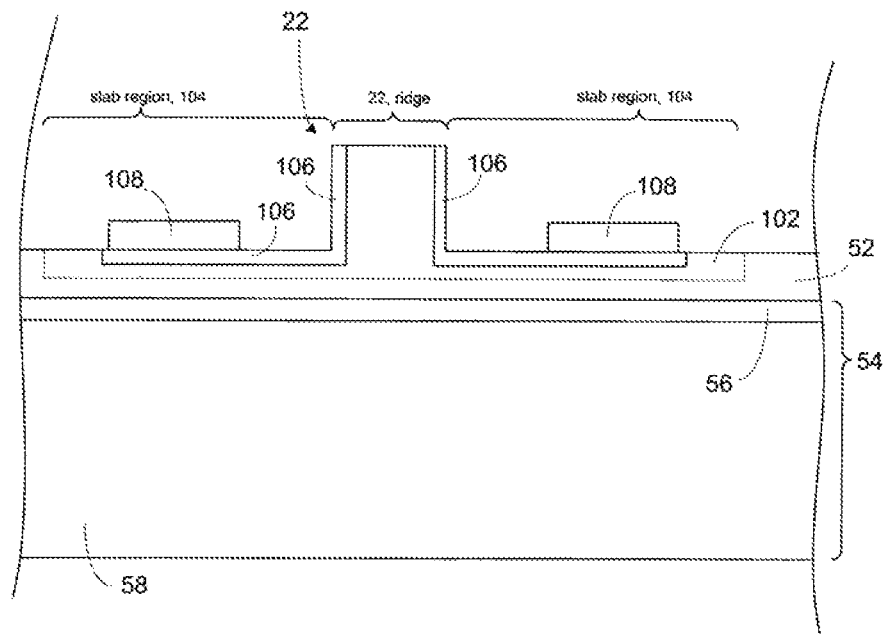
FIG. 10 is a cross section of an optical modulator that employs the Franz-Keldysh effect to modulate light signals.

In some instances, modulators 22 that generate photocurrent in response to the modulation of light signals are preferred modulators 22 because they can also be used as a light sensor and each of these modulators 22 can accordingly replace one of the coupled waveguides 48 and the associated light sensor 50. Examples of these modulators 22 are modulators 22 that make use of the Franz Keldysh effect. An example of such as modulator 22 is disclosed in U.S. patent application Ser. No. 12/653,547. FIG. 10 is a cross section of the modulator 22 disclosed in U.S. patent application Ser. No. 12/653,547. A ridge 100 of an electro-absorption medium 102 extends upward from a slab region 104 of the electro-absorption medium 102. Doped regions 106 are both in the slab regions 104 of the electro-absorption medium 102 and also in the ridge 100 of the electro-absorption medium 102. For instance, doped regions 106 of the electro-absorption medium 102 are positioned on the lateral sides of the ridge 100 of the electro-absorption medium 102. Additionally, the doped regions 106 extend from the ridge 100 into the slab region 104 of the electro-absorption medium 102. FIG. 10 shows the transition of a doped region 106 from the ridge 100 of the electro-absorption medium 102 into the slab region 104 of the electro-absorption medium 102 as continuous and unbroken. When one of the doped regions is an n-type doped region, the other doped region is a p-type doped region.

Electrical conductors 108 are positioned on the slab region 104 of the electro-absorption medium 102. In particular, the electrical conductors 108 each contact a portion of a doped region 106 that is in the slab region 104 of the electro-absorption medium 102.

During operation of the modulators 22 of FIG. 10, the transmitter electronics can be employed to apply electrical energy to the electrical conductors 108 so as to form an electrical field in the electro-absorption medium 102. For instance, the transmitter electronics can form a voltage differential between the doped regions 106. The electrical field can be formed without generating a significant electrical current through the electro-absorption medium 102. The electro-absorption medium 102 can be a medium in which the Franz-Keldysh effect occurs in response to the application of the electrical field. The Franz-Keldysh effect is a change in optical absorption and optical phase by an electro-absorption medium 102. For instance, the Franz-Keldysh effect allows an electron in a valence band to be excited into a conduction band by absorbing a photon even though the energy of the photon is below the band gap. To utilize the Franz-Keldysh effect the active region can have a slightly larger bandgap energy than the photon energy of the light to be modulated. The application of the field lowers the absorption edge via the Franz-Keldysh effect and makes absorption possible. The hole and electron carrier wavefunctions overlap once the field is applied and thus generation of an electron-hole pair is made possible. As a result, the electro-absorption medium 102 can absorb light signals received by the electro-absorption medium 102 and increasing the electrical field increases the amount of light absorbed by the electro-absorption medium 102. Accordingly, the transmitter electronics can tune the electrical field so as to tune the amount of light absorbed by the electro-absorption medium 102. As a result, the transmitter electronics can intensity modulate the electrical field in order to modulate the light signal. Additionally, the electrical field needed to take advantage of the Franz-Keldysh effect generally does not involve generation of free carriers by the electric field.

When the modulator 22 is operated as described above, a photocurrent is generated in the modulator 22 in response to the modulation of a light signal. Since the transmitter electronics can be configured measure the level of photocurrent being generated, the modulator 22 can also be used as a light sensor 50. The transmitter electronics can adjust the level of electrical energy applied to each of the lasers in response to amount of photocurrent being indicated by the associated modulator 22 in a feedback loop. For instance, if the transmitter electronics determine that the amount of photocurrent being generated in a modulator 22 is above a threshold, the transmitter electronics can reduce the level of electrical energy being applied to the associated laser in an effort to reduce the level of photocurrent being generated in the modulator 22. These features allow modulator 22 that can also function as light sensors to each replace one of the coupled waveguides 48 and light sensors 50 shown on the embodiments of FIG. 1 through FIG. 6. Accordingly, the coupled waveguides 48 and the associated light sensors 50 are optional.

Suitable electro-absorption media include semiconductors. However, the light absorption characteristics of different semiconductors are different. A suitable semiconductor for use with modulators 22 employed in communications applications includes $Ge_{1-x}Si_x$ (germanium-silicon) where x is greater than or equal to zero. In some instances, x is less than 0.05, or 0.01. Changing the variable x can shift the range of wavelengths at which modulation is most efficient (the modulation wavelength). For instance, when x is zero, the modulator 22 is suitable for a range of 1610-1640 nm. Increasing the value of x can shift the range of wavelengths to lower values. For instance, an x of about 0.005 to 0.01 is suitable for modulating in the c-band (1530-1565 nm). Additional details regarding the fabrication and/or structure of modulators 22 that employ the Franz-Keldysh effect are disclosed in U.S. patent application Ser. No. 12/653,547.

The light sensor 50 can be a conventional photodetector such as a photodiode. Additionally or alternately, since the modulator construction discussed in the context of FIG. 10 can also be employed as a light sensor, the light sensors 50 of FIG. 2 through FIG. 3 and/or the light sensors 11 of FIG. 1 and/or FIG. 4 can be constructed as disclosed above. A variety of other light sensor 50 constructions are suitable for use with waveguides on a silicon-on-insulator platform. For instance, the light sensor 50 can be constructed and/or operated as disclosed in U.S. patent application Ser. No. 12/380,016, filed Feb. 19, 2009, and entitled "Optical Device Having Light Sensor Employing Horizontal Electrical Field;" U.S. patent application Ser. No. 12/804,769, filed Jul. 28, 2010, and entitled "Light Monitor Configured to Tap Portion of Light Signal from Mid-Waveguide;" and/or in U.S. patent application Ser. No. 12/803,136, filed Jun. 18, 2010, and entitled "System Having Light Sensor with Enhanced Sensitivity;" and/or in U.S. patent application Ser. No. 12/799,633, filed Apr. 28, 2010, and entitled "Optical Device Having Partially Butt-Coupled Light Sensor;" and/or in U.S. patent application Ser. No. 12/589,501, filed Oct. 23, 2009, and entitled "System Having Light Sensor with Enhanced Sensitivity;" and/or in U.S. patent application Ser. No. 12/584,476, filed Sep. 4, 2009, and entitled "Optical Device Having Light Sensor Employing Horizontal Electrical Field;" each of which is incorporated herein in its entirety.

Suitable electronics for operating the different portions of the optical link such as the transmitter electronics and/or the receiver electronics can include a controller. A suitable controller includes, but is not limited to, a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions attributed to the transmitter electronics and/or the receiver electronics. A general-purpose processor may be a microprocessor, but in the alternative, the controller may include or consist of any conventional processor, microcontroller, or state machine. A controller may also be implemented as a combination of computing devices, e.g., a combination of a DSP and a microprocessor, a plurality of microprocessors, one or more microprocessors in conjunction with a DSP core, or any other such configuration.

The transmitter electronics and/or the receiver electronics can optionally include a memory in communication with the controller. The transmitter electronics and/or the receiver electronics can store data for executing the functions of the transmitter electronics and/or the receiver electronics in the memory. The memory can be any memory device or combination of memory devices suitable for read and/or write operations.

In some instances, the transmitter electronics and/or the receiver electronics include a computer-readable medium in communication with the controller. The computer-readable medium can have a set of instructions to be executed by the controller. The controller can read and execute instructions included on the computer-readable medium. The controller executes the instructions such that the transmitter electronics and/or the receiver electronics perform one or more of the described functions. The computer-readable medium cab be different from the memory or can be the same as the memory. Suitable computer-readable media include, but are not limited to, optical discs such as CDs, magnetic storage diskettes, Zip disks, flash memories, magnetic tapes, RAMs, and ROMs. Some functions of the transmitter electronics and/or the receiver electronics may be executed using hardware as opposed to executing these functions in firmware and/or software.

Although the transmitter is described in the context of each laser cavity producing a laser signal having different wavelengths, the transmitter can be constructed such that two or more of the laser cavities generate laser signals having the same range of wavelengths. The gain waveguides and/or cavity waveguides of laser cavities configured to generate lasers signals having the same wavelength can be optically coupled as a result of their proximity on the device. Optical coupling of these one or more of these waveguides can increase the power of the laser signals as described in U.S. Patent Application Ser. No. 61/463,054, filed on Feb. 10, 2011, entitled "Laser Combining Light Signals from Multiple Laser Cavities," and incorporated herein in its entirety. The gain waveguides and/or cavity waveguides of laser cavities configured to generate lasers signals of different wavelengths are optically decoupled.

The transmitter and receiver in above optical link are configured to operate over an operational temperature range. For instance, the above optical link should be able to continue operating when the transmitter and receiver are each positioned in an environment having temperatures extending from TL to TH. Further, since the transmitter and receiver are positioned in different locations that are at different temperatures, the optical link should be able to operate when the transmitter is at TL and the receiver is at TH or the transmitter is at TH and the receiver is at TL. In some instances, TL is below 0° C., 10° C., or 20° C. and/or TH is greater than 50° C., 70° C., or 80° C. The values of TH and TL associated with the receiver can be the same as or different from the values of TH and TL associated with the transmitter. The operational temperature range is generally defined as part of the specification for the transmitter and/or receiver. In general the operational temperature range is designed so the transmitter and/or receiver meets customer requirements. The operational temperature range is generally the same for the transmitter and receiver.

Components on the transmitter generally produce heat during operation. For instance, the lasers, modulators, any local heaters on the transmitter, and any associated electronics produce heat during operation. The heat produced by the components on the transmitter can increase the temperature of the transmitter above the temperature of the atmosphere in which the transmitter is positioned by TC during operation of the transmitter. Accordingly, the temperature of the transmitter is generally equal to about TA+TC where TA is the temperature of the atmosphere in which the transmitter is positioned. As a result, in order for the link to operate in the above range of atmospheric temperatures, the transmitter should be operated at temperatures up to TH+TC.

Components on the receiver also produces heat during operation. For instance, the light sensors and any associated electronics produce heat during operation of the receiver. The heat produced by the components on the receiver can increase the temperature of the receiver by RC during operation of the receiver. Accordingly, the temperature of the receiver is generally equal to about TA+RC where TA is the temperature of the atmosphere in which the receiver is positioned. As a result, in order for the link to operate in the above range of atmospheric temperatures, the receiver should be operate at temperatures up to TH+RC.

During operation of the optical link, the transmitter and receiver are each positioned in an atmosphere that can range from TL to TH. During a portion of this temperature range, the transmitter is operated without the use of common temperature control and during another portion of this temperature range the transmitter is operated with common temperature control. For instance, suppose that the transmitter is located in an atmosphere that can range from 0° C. to 70° C. When the temperature of the atmosphere is from 40° C. to 70° C., the common temperature controller is not employed to control the temperature of the transmitter, however, when the temperature of the atmosphere is from 0° C. up to 40° C., the common temperature controller is used. Accordingly, the portion of the atmospheric temperature between 40° C. and 70° C. serves as the uncontrolled portion of the temperature range and the portion of the atmospheric temperature from 0° C. up to 40° C. serves as the controlled portion of the temperature range. When the common temperature control is used, the temperature of the transmitter is kept above the lower limit of the uncontrolled portion of the temperature range (TUTR+TC). For instance, in the above example, when the atmospheric temperature is below 40° C., (TUTR=40° C.) the common temperature controller is operated so as to keep the temperature of the transmitter at or above (40+TC°) C. In some instances, TH serves as the upper limit of the uncontrolled portion of the temperature range as is illustrated in the above example, so that the temperature of the transmitter is operated at a maximum temperature of (TH+TC) ° C.

The different components on the transmitter respond to temperature changes differently. For instance, the wavelength of light produced by a particular laser cavity changes with temperature changes. Similarly, the wavelength that is most efficiently modulated by a modulator also changes in response to changes in temperature. However, the responses to temperature changes are different for different components. As a result, the modulator may be able to efficiently modulate the laser light signal received by that modulator when the transmitter is at a particular temperature, however, as the temperature of the transmitter changes, the modulator may no longer be able to efficiently modulate the laser light signal received by that modulator. The wavelengths that are most efficiently multiplexed by the multiplexer also change with changes in temperature adding even more complexity to the effects of temperature on the transmitter.

The change in the modulation wavelengths output by the transmitter are largely a result of the channel wavelength output by each of the laser cavities shifting in response to changes in temperature. The channel wavelength is the wavelength that the laser cavity is designed to output or the most intense wavelength output by a laser cavity at a particular temperature. Since the laser cavities determine the wavelengths of the modulated light signals output by the transmitter, the total possible range of wavelengths output by the transmitter when the transmitter is operated between TUTR+TC and TH+TC can be determined by $((TH-TUTR)*(d\lambda/dT)+2*tol)$ (Expression 1). In this above expression, tol represent the manufacturing tolerance of the laser cavities. For instance, when a laser cavity is designed to produce a channel wavelength of $\lambda t$, tol represents 3 times the standard deviation of the result (3-sigma). As an example, a laser cavity designed to produce a channel wavelength of $\lambda t$ will generally result in a laser cavity that produces a channel wavelength of $\lambda t+/-tol$. The manufacturing tolerance for distributed feedback lasers (DFBs) can be around +/−1 and can be as high as +/−3 nm. The laser cavities disclosed above are external cavity lasers (ECLs) and generally have a lower tolerance of around +/−0.5 nm. In the above expression, $d\lambda/dT$ represents the change in the channel wavelength output by a laser cavity in response to temperature changes. For a DFB laser or an ECL laser working in the C-band range of wavelengths (1530-1565 nm), $d\lambda/dT$ is generally greater than 0.07 nm/° C., or 0.075 nm/° C. and/or less than 0.085 nm/° C., or 0.095 nm/° C. For a DFB laser or an ECL laser constructed as disclosed above, the $d\lambda/dT$ is about 0.08 nm/° C. for C-band wavelengths.

The mutliplexer is associated with several center wavelengths. The center wavelengths of the multiplexer are the wavelengths at the center of the bandwidth for each waveguide that provides input to the multiplexer. In other words, each of the center wavelengths is one of the wavelengths that is most efficiently multiplexed by the multiplexer. The center wavelengths of the multiplexer also changes in response to temperature changes. However, the multiplexers disclosed above generally have a temperature dependence that tracks the temperature dependence of the laser cavities. For instance, the center wavelengths of the multiplexer generally shifts about 0.085 nm/° C. for C-band wavelengths. Because the 0.085 nm/° C. for the multiplexer approximates the 0.08 nm/° C. $d\lambda/dT$ for the lasers disclosed above, the value of $d\lambda/dT$ used in the above expression can be $d\lambda/dT$ for the laser cavities or for the center wavelength of the multiplexer. However, in general, the smaller of the two values is used in the Expression 1.

The wavelengths that can be efficiently processed by the receiver also shift with changes in temperature. Light sensors constructed as disclosed above are able to sense light across a broad range of wavelengths. As a result, the total range of wavelengths over which the receiver can operate without common temperature control is controlled by the demultiplexer.

Since the shift in wavelengths that can be efficiently processed by the receiver is essentially controlled by the demultiplexer, the total range of wavelengths that a receiver held at constant temperature can process efficiently can be expressed as DBW*CS (Expression 2). In expression 6, DBW represents the bandwidth of the demultiplexer. The bandwidth of the demultiplexer is the range over which the modulation wavelength of the modulated signals can shift before the demultiplexer is unable to efficiently demultiplex the light signals. The bandwidth, DBW, is expressed as a percentage of the channel spacing, CS. For instance, if the channel wavelengths produced by the laser cavities (channels) are each separated by 8 nm (CS=8 nm) and the modulation wavelengths of the modulated signals can each shift over a range of 6 nm before the multiplexer is unable to efficiently multiple the light signals, the DBW is 75% (6 nm/8 nm). The DBW for the demultiplexers constructed as discussed above and included in a receiver is generally about 65%, 50%, or 30%. The DBW for the demulitplexer included in a receiver can be higher than the BW for the multiplexer included in the transmitter because the multiplexer input waveguides included in the transmitter are preferably single mode where the demulitplexer output waveguides included in the receiver can optionally be multi-mode. The ability of the demultiplexer output waveguides to be multi-mode provides for a broader bandwidth than can be achieved with a single mode demultiplexer for no significant additional optical loss.

The DBW for a demuliplexer can be determined by a calculation of the overall loss budget of the optical link. Generally, demultiplexer bandwidths are given to 1 dB loss points in that over the bandwidth of the demultiplexer the insertion loss will not vary by more than 1 dB. If there is sufficient loss budget for the link, then the bandwidth may be widened by defining it with respect to higher loss points such as 2 dB. In some instances, the maximum loss over the bandwidth is 2 dB, and the overall system loss budget must be able to accommodate this additional loss. Loss factors to be considered in calculating a loss budget are the losses in the receiver and transmitter chips including the modulators, the coupling losses of the optical fiber to the transmitter and receiver chips, the optical loss in the optical fiber, the laser output power and the detector sensitivity at the receiver. If the total optical power arriving at the detector is below the detector sensitivity, then the optical link will not be viable. In addition to the loss factors, there are other considerations such as fiber dispersion and sources of noise within the system that in most cases can be considered as equivalent to additional loss. Since some of these factors vary with environment and age, most systems will specify a loss margin of for example 3-6 dB. For instance, the overall loss budget must allow for an additional 3-6 dB loss from variable sources or from system aging.

Expression 1 and expression 2 can be compared to determine the largest possible uncontrolled temperature range. For instance, note that the largest possible uncontrolled temperature range occurs when the total range of each modulation wavelength that can be output by the transmitter is equal to the total range of wavelengths that a receiver held at constant temperature can process efficiently. Accordingly, the largest possible uncontrolled temperature range occurs when $((TH-TUTR)*(d\lambda/dT)+2*tol)$ (Expression 1)=DBW*CS (Expression 2). We can solve this for TH−TUTR to find that the largest possible uncontrolled temperature range occurs when TH−TUTR=(DBW*CS−2*tol)/(d$\lambda$/dT). As a result, the lowest possible TUTR that will allow the receiver to efficiently process each of the modulated wavelengths output by the transmitter when the transmitter is operated at any temperature from TUTR to TH without the use of a common temperature controller is TUTR=TH−(DBW*CS−2*tol)/(d$\lambda$/dT). The value of TUTR in this equation may or may not represent the actual value of TUTR used during the operation of the optical link because the TUTR in this equation represents the lower limit of possible values for TUTR. As a result, this expression is better written as $TUTR_{lim}$=TH−(DBW*CS−2*tol)/(d$\lambda$/dT) (Expression 3). Accordingly, the transmitter can be operated without the use of a common temperature controller when the atmosphere in which the transmitter is placed is in a range that extends from TH down to a temperature that is equal to or greater than $TUTR_{lim}$.

The performance of the modulators will become less efficient as the temperature of the transmitter's atmosphere fluctuates. For instance, the most efficient wavelength modulated by a modulator is the modulation wavelength for that modulator. The modulation wavelength for a modulator also shifts with wavelength. However, unlike the multiplexer, the shift in modulation wavelength does not track the shift in channel wavelength of the laser cavities. For instance, for modulators the change in modulation wavelength with temperature $d\lambda/dT$ is generally greater than 0.6 nm/° C., or 0.7 nm/° C. and/or less than 0.8 nm/° C., or 0.9 nm/° C. For a modulator constructed as disclosed above, the change in modulation wavelength with temperature is about 0.76 nm/° C. (~0.8 nm/° C.). However, as discussed above, for a DFB laser or an ECL laser constructed as disclosed above, the $d\lambda/dT$ is about 0.08 nm/°

C. As a result, the response of the modulation wavelength to temperature changes can be nearly an order of magnitude higher than the response of the channel wavelength.

Figure 11:
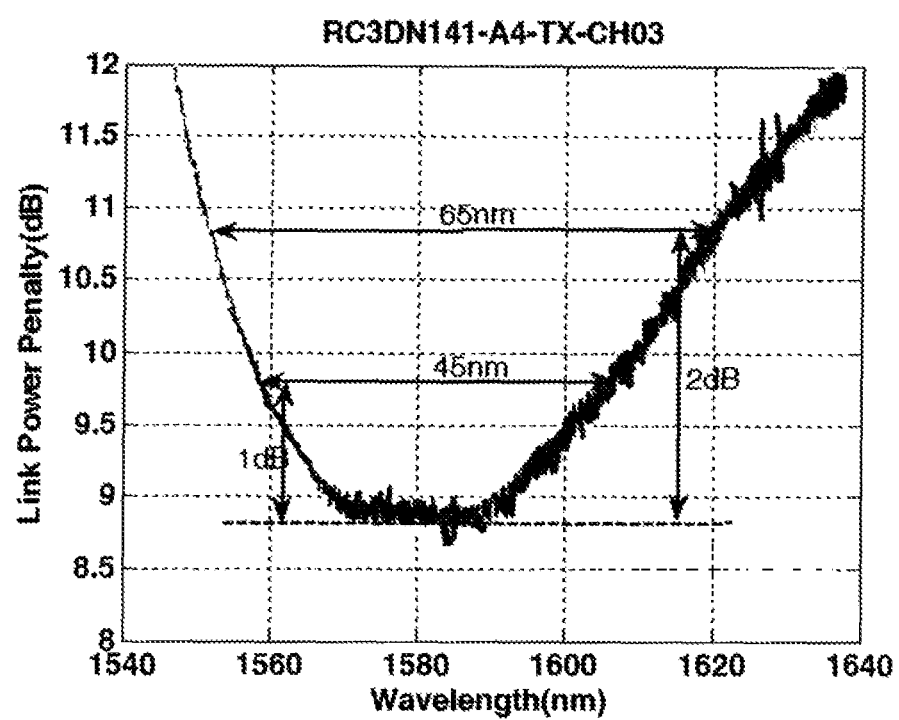
FIG. 11 is a graph shows the amount of optical loss resulting from modulating a particular wavelength.

Since the modulation wavelength changes with temperature more than the wavelength output by the laser cavity, the modulator efficiency decreases in response to temperature changes. This concept is illustrated in FIG. 11 for a modulator constructed as disclosed above. FIG. 11 shows the amount of optical loss that results from modulating a particular wavelength. As is evident from FIG. 11, a modulator can modulate over a range of about 45 nm while incurring optical loss of less than 1 dB or can modulate over a range of about 65 nm while incurring optical loss of less than 2 dB.

Suppose all of the modulators have the same construction and accordingly have the same modulation wavelength when they are at the same temperature. For instance, suppose that the modulators all have a modulation wavelength of 1580 nm at 50° C. Also suppose that the transmitter includes four laser cavities and that at 50° C. the channel wavelengths are 1568 nm, 1576 nm, 1584 nm, and 1592 nm. Further, suppose that TH is 70° C. and TUTR is 30° C. In this arrangement, when the temperature is at 30° C. the largest wavelength that will have to be modulated is 1592 nm−20° C.*0.08 nm/° C.=1590.4 nm but the modulator will have a modulation wavelength of 1580−20° C.*0.76 nm/° C.=1564.8 nm. When the temperature is at 70° C. the lowest wavelength that will have to be modulated is 1568 nm+20° C.*0.08 nm/° C.=1569.6 nm but the modulator will have a modulation wavelength of 1580+20° C.*0.76 nm/° C.=1595.2 nm. As a result, the modulators must modulate light signals where the difference between the modulation wavelength and the actual wavelength being modulated ranges from +25.6 nm to −25.6 nm for a total range of 51.2 nm.

The above range of 51.2 nm does not take into consideration the manufacturing tolerance of the modulators. When a modulator is designed for a modulation wavelength of $\lambda m$, mtol represents 3 times the standard deviation of the result. As an example, a modulator designed for a modulation wavelength of $\lambda m$ will generally result in a modulator with a modulation wavelength of $\lambda m$+/−mtol. The manufacturing tolerance for modulators that are fabricated as disclosed above is around +/−3 nm and can be as high as +/−5 nm. Adding a factor of 2*mtol to the above range corrects for manufacturing tolerance. As a result, the modulators must modulate light signals where the difference between the modulation wavelength and the actual wavelength being modulated ranges from 51.2 nm+2*mtol or 51.2 nm+2*5 nm or 61.2 nm. FIG. 11 shows that a range of 65 nm is associated with a loss of around 2 dB. As a result, if a loss of 2 dB is acceptable within the loss budget of the link, this arrangement of modulators is acceptable.

As noted above, rather than having the same construction, each of the modulators can be configured such that the modulation wavelength matches the channel wavelength at a particular temperature. For instance, different modulators can be constructed differently and/or different modulators can include localized heaters that are operated so as to change the modulation wavelength to a particular level. Now consider the above example but with each of the modulators constructed to have a modulation wavelength matched to the received channel wavelength at 50° C. For instance, suppose that the transmitter includes four laser cavities and that at 50° C. the channel wavelengths are 1568 nm, 1576 nm, 1584 nm, and 1592 nm and that the associated modulation wavelengths are respectively 1568 nm, 1576 nm, 1584 nm, and 1592 nm. Further, suppose that TH is 70° C. and TUTR is 30° C. In this arrangement, when the temperature is at 30° C. the largest wavelength that will have to be modulated is 1592 nm−20° C.*0.08 nm/° C.=1590.4 nm but the associated modulator will have a modulation wavelength of 1592−20° C.*0.76 nm/° C.=1576.8 nm. When the temperature is at 70° C. the lowest wavelength that will have to be modulated is 1568 nm+20° C.*0.08 nm/° C.=1569.6 nm but the modulator will have a modulation wavelength of 1568+20° C.*0.76 nm/° C.=1583.2 nm. As a result, the modulators must modulate light signals where the difference between the modulation wavelength and the actual wavelength being modulated ranges from +13.6 nm to −13.6 nm for a total range of 27.2 nm. When we correct this range for manufacturing tolerance, the modulators must modulate light signals where the difference between the modulation wavelength and the actual wavelength being modulated ranges from 27.2 nm+2*mtol or 27.2 nm+2*5 nm or 37.2 nm. Because this 37.2 nm range is substantially below the 45 nm range disclosed in FIG. 11, modulators in this arrangement will be responsible for a very low level of optical loss. However, when localized heaters are used on the modulators in order to achieve this result, there becomes a balance between the power savings that results from limiting the temperature range over which the common temperature controller is used and the increased power required by the localized heaters.

The above discussion assumes that a common temperature controller maintains the receiver at a constant temperature. In these circumstances, the common temperature controller generally maintains the receiver at a temperature that is DTR above the top of the operational range (TH). For instance, the common temperature controller generally maintains the receiver at TH+DTR. In some instances, DTR is a constant that is greater than or equal to RC. For instance, DTR can be 10° C., 15° C., or 20° C. For instance, when TH is 70° C., the receiver is generally maintained at a temperature of about 80° C.

In many circumstances, it is possible to operate the receiver with an uncontrolled receiver temperature range. For instance, when TUTR is greater than $TUTR_{lim}$, the temperature of the receiver can be allowed to float for at least portion of the operational temperature range (TL to TH). The receiver is also positioned in an atmosphere that can range from TL to TH independent of the temperature of the transmitter. During a portion of this temperature range, the receiver can be operated without the use of common temperature control and during another portion of this temperature range the transmitter is operated with common temperature control. For instance, suppose that the receiver is located in an atmosphere that can range from 0° C. to 70° C. When the temperature of the atmosphere is from 60° C. to 70° C., the common temperature controller is not employed to control the temperature of the receiver, however, when the temperature of the atmosphere is from 0° C. up to 60° C., the common temperature controller is used to control the temperature of the receiver. Accordingly, the portion of the atmospheric temperature between 60° C. and 70° C. serves as the uncontrolled receiver portion of the temperature range and the portion of the atmospheric temperature from 0° C. up to 60° C. serves as the controlled receiver portion of the temperature range. When the common temperature control is used, the temperature of the receiver is kept at or above the lower limit of the uncontrolled portion of the temperature range (TRUTR). For instance, in the above example, when the atmospheric temperature is below 60° C., the common temperature controller is operated so as to keep the temperature of the receiver at or above 60° C. and below 70° C.+RC. In some instances, TH serves as the upper limit of the uncontrolled receiver portion of the temperature range as is illustrated in the above example.

As noted above, when TUTR is greater than $TUTR_{lim}$, the operational temperature range for the atmosphere of the receiver can include an uncontrolled receiver temperature range extending from TH down to TRUTR. The value of TRUTR can be decreased until the range of modulation wavelengths that the receiver can process at both TH and TRUTR is at least equal to the range of modulation wavelengths that each modulation signal can have during operation of the transmitter while the atmosphere of the transmitter varies to TL to TH. In some instances, it may be possible to bring TRUTR all the way down to TL while retaining this condition. As a result, in some instances, the uncontrolled receiver portion of the temperature range can extend from TH to TL. In these instances, a common temperature controller may be optional for the receiver.

In some instances, the components on the transmitter and receiver are designed to be wavelength matched at a particular temperature. For instance, the operational range for the transmitter and receiver is generally about 0° C. to 70° C. As a result, the components on the transmitter are receiver are designed to be wavelength matched at a target temperature between 0° C. to 70° C. such as 60° C. For instance, the modulation wavelengths can be matched to the center wavelengths at the target temperature. Alternately, the modulation wavelengths can be matched to the center wavelengths and one of the modulation wavelengths can be matched to a channel wavelength at the target temperature. Alternately, the modulation wavelengths, the channel wavelengths, and the center wavelengths can be matched at the target temperature. Matching of these wavelengths provides more efficient operation of the transmitter over a larger range of temperatures. In some instances, the target temperature is included in the uncontrolled portion of the operational temperature range of the transmitter.

As noted above, the transmitter electronics employ a common temperature controller to control the temperature of the transmitter in response to output from one or more common temperature sensors. For instance, when the output of the one or more common temperature sensors indicates that the temperature of the transmitter is below TUTR (or TUTR+TC), the transmitter electronics can operate the common temperature controller such that the temperature of the transmitter is at or above TUTR, or at or above TUTR+TC. In some instances, when the output of the one or more common temperature sensors indicates that the temperature of the transmitter is below TUTR (or TUTR+TC), the transmitter electronics can operate the common temperature controller such that the temperature of the transmitter is at or above TUTR, or at or above TUTR+TC and is also less than or equal to TH, TH+TC, or TH+DTT where DTT is a constant that is greater than TC. In contrast, when the output of the one or more common temperature sensors indicates that the temperature of the transmitter is above TUTR (or above TUTR+TC), the transmitter electronics can allow the temperature of the transmitter to float and/or can operate the common temperature controller such that the temperature of the transmitter is less than or equal to TH, TH+TC, or TH+DTT where DTT is a constant that is greater than TC.

In some instances, the transmitter electronics are also in electrical communication with one or more atmosphere temperature sensors. The one or more atmosphere temperature sensors can be positioned such that the output of the one or more atmosphere temperature sensors indicates the temperature of the atmosphere in which the transmitter is positioned. The transmitter electronics can operate the common temperature controller in response to output from the one or more common temperature sensors and the one or more atmosphere temperature sensors. For instance, when the output of the one or more atmosphere sensors indicates that temperature of the atmosphere falls below TUTR (or TUTR+TC), the transmitter electronics can use the output of the one or more common temperature sensors to operate the common temperature controller such that the temperature of the transmitter is at or above TUTR, or at or above TUTR+TC. In some instance, when the output of the one or more atmosphere sensors indicates that temperature of the atmosphere falls below TUTR (or TUTR+TC), the transmitter electronics can use the output of the one or more common temperature sensors to operate the common temperature controller such that the temperature of the transmitter is at or above TUTR, or at or above TUTR+TC and is also less than or equal to TH, TH+TC, or TH+DTT where DTT is a constant that is greater than TC. In contrast, when the output of the one or more atmosphere sensors indicates that temperature of the atmosphere is at or above TUTR (or TUTR+TC), the transmitter electronics can allow the temperature of the transmitter to float and/or can operate the common temperature controller such that the temperature of the transmitter is less than or equal to TH, TH+TC, or TH+DTT where DTT is a constant that is greater than TC. Suitable atmosphere temperature sensors include, but are not limited to, thermocouples, thermistors, resistive thermal devices (RTDs), and semiconductor temperature sensors.

As noted above, in some instances, the receiver electronics employ a common temperature controller to control the temperature of the receiver in response to output from one or more common temperature sensors. For instance, when the output of the one or more common temperature sensors indicates that the temperature of the receiver is below TRUTR (or TRUTR+RC), the receiver electronics can operate the common temperature controller such that the temperature of the receiver is at or above TRUTR, or at or above TRUTR+RC. In some instance, when the output of the one or more common temperature sensors indicates that the temperature of the receiver is below TRUTR (or TRUTR+RC), the receiver electronics can operate the common temperature controller such that the temperature of the receiver is at or above TRUTR, or at or above TRUTR+RC and is also less than or equal to TH, TH+RC, or TH+DTR where DTR is a constant that is greater than RC. In contrast, when the output of the one or more common temperature sensors indicates that the temperature of the receiver is at or above TRUTR (or TRUTR+RC), the receiver electronics can allow the temperature of the receiver to float and/or can operate the common temperature controller such that the temperature of the receiver is less than or equal to TH, TH+RC, or TH+DTR where DTR is a constant that is greater than RC.

In some instances, the receiver electronics are also in electrical communication with one or more atmosphere temperature sensors. The one or more atmosphere temperature sensors can be positioned such that the output of the one or more atmosphere temperature sensors indicates the temperature of the atmosphere in which the receiver is positioned. The receiver electronics can operate the common temperature controller in response to output from the one or more common temperature sensors and the one or more atmosphere temperature sensors. For instance, when the output of the one or more atmosphere sensors indicates that temperature of the atmosphere falls below TRUTR (or TRUTR+RC), the receiver electronics can use the output of the one or more common temperature sensors to operate the common temperature controller such that the temperature of the receiver is at or above TRUTR, or at or above TRUTR+RC. In some instance, when the output of the one or more atmosphere sensors indicates that temperature of the atmosphere falls below TRUTR (or TRUTR+RC), the receiver electronics can use the output of the one or more common temperature sensors to operate the common temperature controller such that the temperature of the receiver is at or above TRUTR, or at or above TRUTR+RC and is also less than or equal to TH, TH+RC, or TH+DTR where DTR is a constant that is greater than RC. In contrast, when the output of the one or more atmosphere temperature sensors indicates that the temperature of the receiver is at or above TRUTR (or TRUTR+RC), the receiver electronics can allow the temperature of the receiver to float and/or can operate the common temperature controller such that the temperature of the receiver is less than or equal to TH, TH+RC, or TH+DTR where DTR is a constant that is greater than RC.

The above discussions set forth circumstances where electronics allow the temperature of the receiver or transmitter to float. When the electronics allow the temperature of the receiver or transmitter to float, the electronics may refrain from employing the common temperature controller to control the temperature of the receiver or transmitter. As a result, the temperature of the receiver or transmitter reflects the temperature of the atmosphere in which the receiver or transmitter is positioned. For instance, the temperature of a floating transmitter will generally be equal to TA+TC and the temperature of a floating receiver will generally be equal to TA+RC. These equations assume that the TA is constant or changes slowly enough that the receiver or transmitter remain in thermal equilibrium with the atmosphere. In the event that the temperature atmosphere changes more quickly than the temperature of the receiver or transmitter, there may be time lag before the temperature of a floating transmitter becomes TA+TC or the temperature of a floating becomes TA+RC.

As is also discussed above, in some instances, the receiver electronics operate the common temperature controller such that the temperature of the receiver is held at a substantially constant temperature. For instance, the receiver electronics can use the output of the one or more common temperature sensors to hold the temperature of the receiver at TH+RC or TH+DTR where DTR is a constant that is greater than RC.

In some instances, TUTR is higher than 10, 20, or 30° C. and/or is 10, 20, or 30° C. more than the lower limit of the operational range, TL, for the transmitter and the lower limit of the operational temperature range for the transmitter is greater than −40, −20, or 0° C.

EXAMPLE 1

An optical link is configured to operate with the receiver and transmitter in different environments that can each vary from TL=0° C. to TH=70° C. The receiver includes a common temperature controller that is operated so as to retain the temperature of the receiver constant above TH+RC at 80° C. The transmitter is configured to generate four modulated signals with a channel spacing (CS) of 8 nm. The channel wavelengths are 1515 nm, 1523 nm, 1531 nm, and 1539 nm at 60° C. Accordingly, the combiner is configured to have center wavelengths of 1515 nm, 1523 nm, 1531 nm, and 1539 nm at 60° C. The modulators can be constructed such that each modulation wavelength is matched to the channel wavelength at 60° C. Alternately, the modulators can each have the same construction and can accordingly have the same modulation wavelength at 60° C. For instance, the modulators can each have a modulation wavelength of 1521 nm at 60° C.

The bandwidth (DBW) for the demultiplexers constructed as discussed above can be as high as 65% and the external cavity lasers (ECLs) disclosed above generally have a manufacturing tolerance of around +/−0.5 nm. For a DFB laser or an ECL laser constructed as disclosed above, the $d\lambda/dT$ is about 0.08 nm/° C. and the $d\lambda/dT$ for the center wavelength of the above multiplexers is about 0.08 nm/° C. Substituting these numbers into $TUTR_{lim}=TH-(DBW*CS-2*tol)/(d\lambda/dT)$ shows that the lowest possible value for TUTR ($TUTR_{lim}$) is 30° C. Accordingly, when the receiver is held at a constant temperature, the uncontrolled temperature range for the atmosphere of the transmitter can extend from 30° C. to 70° C. (TUTR=30° C.). Further, using a higher TUTR such as 40° C. would allow the operational range of the receiver to include an uncontrolled receiver temperature range.

A single gain medium can be used for each of the laser cavities. Additionally, when each of the modulators has the same structure and composition and has a modulation wavelength of 1521 nm at 60° C., a loss of 2 dB is expected to be associated with the modulators. However, when each of the modulators is tailored to have a modulation wavelength that is matched to the channel wavelength at 60° C., the expected loss drops to around 1 dB.

As discussed above, one technique for constructing the modulators such that each modulation wavelength is matched to the channel wavelength at 60° C. is to place localized temperature controllers on the transmitter such that each modulator is associated with one or more localized temperature controllers. The localized temperature controllers can then be operated such that the modulation wavelength of all or a portion of the modulators matches the channel wavelength received at 60° C. In one arrangement, each of the modulators is constructed such that at 60° C., the modulation wavelengths are all 1515 nm; however, the localized temperature controllers are operated such when the transmitter is in a 60° C. atmosphere, the modulation wavelength of three of the modulators is shifted to 1523 nm, 1531 nm, and 1539 nm. Operating these modulators in this manner will generally be associated with about a 90 mW power demand.

EXAMPLE 2

An optical link is configured to operate with the receiver and transmitter in different environments that can each vary from TL=0° C. to TH=70° C. The receiver includes a common temperature controller that is operated so as to retain the temperature of the receiver constant above TH+RC at 80° C. The transmitter is configured to generate four modulated signals with a channel spacing (CS) of 20 nm. The channel wavelengths are 1515 nm, 1535 nm, 1555 nm, and 1575 nm at 60° C. Accordingly, the combiner is configured to have center wavelengths of 1515 nm, 1535 nm, 1555 nm, and 1575 nm at 60° C. The modulators cannot each have the same construction because a single modulator construction does generally not have the bandwidth to efficiently modulate wavelengths from 1515-1575 nm varied over temperatures from 0-70° C. However, the modulators can be constructed such that each modulation wavelength is matched to the received channel wavelength at 60° C. For instance, different levels of silicon in the electro-absorption media of different modulators combined with localized temperature controllers can be employed to shift the modulation wavelengths to the desired levels. Additionally, due to the larger range of wavelengths, it may not be desirable to use a single gain medium for each of the laser cavities. As a result, the transmitter may need to include multiple gain media.

The bandwidth (DBW) for the demultiplexers constructed as discussed above can be as high as about 65% and the external cavity lasers (ECLs) disclosed above generally have a manufacturing tolerance of around +/−0.5 nm. For a DFB laser or an ECL laser constructed as disclosed above, the $d\lambda/dT$ is about 0.08 nm/° C. and the $d\lambda/dT$ for the center wavelength of the above multiplexers is about 0.08 nm/° C. Substituting these numbers into $TUTR_{lim}=TH-(DBW*CS-2*tol)/(d\lambda/dT)$ shows that the lowest possible value for TUTR ($TUTR_{lim}$) is around −70° C. When the value of TUTR is below TL (0° C.), then a common temperature controller is not necessary and the uncontrolled portion of the operational temperature range for the transmitter can be 100% of the operational temperature range for the transmitter. Further, when TUTR is below the 0° C. lower limit of the operational range for the transmitter, a demultiplexer with a much lower bandwidth can be employed. For instance, a demultiplexer with a bandwidth ratio of 35% would provide a $TUTR_{lim}$ that is still below 0° C. (−7.5 0° C.). Additionally, or alternately, the operational range of the receiver could include an uncontrolled receiver temperature range.

EXAMPLE 3

An IEEE standard LAN employs channel wavelengths around 1.3 µm with a channel spacing around 4.5 nm. At these wavelengths, $d\lambda/dT$ is about 0.07 nm/° C. and the bandwidth ratio (DBW) for the demultiplexers is about 65%. The different environments for the receiver and transmitter can each vary from TL=0° C. to TH=70° C. The receiver includes a common temperature controller that is operated so as to retain the temperature of the receiver constant above TH+RC at 80° C. Substituting these numbers into $TUTR_{lim}=TH-(DBW*CS-2*tol)/(d\lambda/dT)$ shows that the lowest possible value for TUTR ($TUTR_{lim}$) is around 40° C.

Other embodiments, combinations and modifications of this invention will occur readily to those of ordinary skill in the art in view of these teachings. Therefore, this invention is to be limited only by the following claims, which include all such embodiments and modifications when viewed in conjunction with the above specification and accompanying drawings.

The invention claimed is:

1. An optical system, comprising:
   a transmitter including multiple laser cavities that each generates an optical channel at a different channel wavelength,
   the transmitter being configured to modulate the optical channels into modulated light signals,
   the transmitter configured to operate in an atmosphere having an operational temperature range that includes a temperature range extending from TL to TH; and
   transmitter electronics are configured to elevate the temperature of the transmitter when the temperature of the atmosphere is in a first portion of the temperature range extending from TL to TH but not elevate the temperature of the transmitter when the temperature of the atmosphere is in a second portion of the temperature range extending from TL to TH;
   the transmitter electronics elevating the temperature of the transmitter to a temperature above a second temperature in response to a first temperature falling below a temperature threshold,
      the first temperature being selected from a group consisting of a temperature of the transmitter and a temperature of the atmosphere in which the transmitter is located, the second temperature being greater than or equal to the temperature threshold; and
      the temperature threshold being between TL and TH and also being greater than or equal to $TH-(DBW*CS-2*tol)/(d\lambda/dT)$ where DBW is a bandwidth of a demultiplexer suitable for demultiplexing the modulated light signals, CS is a wavelength spacing between the channels wavelength, tol is a manufacturing tolerance for the channel laser cavities, and $d\lambda/dT$ represents a shift in a channel wavelength for each optical channel in response to temperature.

2. The system of claim 1, wherein the electronics are configured to refrain from heating the transmitter when the first temperature is above the temperature threshold.

3. The system of claim 1, wherein the electronics operate a common temperature controller in order to heat the transmitter and the electronics do not operate the common temperature controller when the first temperature is above the temperature threshold and below TH.

4. The system of claim 1, wherein DBW is less than 65%.

5. The system of claim 1, wherein CS is less than 30 nm.

6. The system of claim 1, wherein TH is greater than 60° C.

7. The system of claim 1, wherein the electronics are configured to allow the temperature of the transmitter to float when the first temperature is above the temperature threshold.

8. The system of claim 1, wherein the transmitter electronics are configured to heat the transmitter such that when the first temperature is below the temperature threshold, the electronics are configured to control the temperature of the transmitter such that the temperature of the transmitter is less than TH.

9. The system of claim 1, further comprising: an optical receiver in optical communication with the transmitter such that the receiver receives the modulated signals, the receiver including a demultiplexer for demultiplexing the received modulated signals and DBW representing the bandwidth of the demultiplexer included in the receiver.

10. The system of claim 9, further comprising: receiver electronics configured to maintain the temperature of the receiver at a constant temperature.

11. The system of claim 10, wherein the receiver is configured to operate in an atmosphere having an operational temperature range extending from RTL to RTH and the receiver electronics configured to control the temperature of the receiver such that the temperature of the receiver is above a second receiver temperature when a first receiver temperature is above a receiver temperature threshold and also when the first receiver temperature is below the receiver temperature threshold,
   the first receiver temperature being selected from a group consisting of a temperature of the receiver and a temperature of the atmosphere in which the receiver is located,
   the receiver temperature threshold being between RTL and RTH and the second receiver temperature being at least equal to the receiver temperature threshold.

12. The system of claim 1, wherein the transmitter includes modulators for modulating the optical channels, each modulator receiving one of the optical channels.

13. The system of claim 1, wherein the transmitter includes a combiner configured to combine the modulated light signals into an output light signal that exits the transmitter through a facet, the combiner being associated with multiple center wavelengths.

14. The system of claim 13, wherein channel wavelengths are each the same as one of the center wavelengths of the combiner at a target temperature, the target temperature being between the temperature threshold and TH.

15. The system of claim 13, wherein channel wavelengths are each the same as one of the center wavelengths of the combiner at a target temperature and at least one of the modulators has a modulation wavelength that is the same as the channel wavelength of one of the laser cavities, the target temperature being between the temperature threshold and TH.

16. The system of claim 13, wherein channel wavelengths are each the same as one of the center wavelengths of the combiner at a target temperature and the modulators each have a modulation wavelength that is the same as the channel wavelength of one of the laser cavities, the target temperature being between the temperature threshold and TH.

17. An optical system, comprising:
- a transmitter including multiple laser cavities that each generates an optical channel at a different channel wavelength,
  - the transmitter being configured to modulate the optical channels into modulated light signals,
  - the transmitter configured to operate in an atmosphere having an operational temperature range that includes a temperature range extending from TL to TH; and
  - transmitter electronics are configured to elevate the temperature of the transmitter when the temperature of the atmosphere is in a first portion of the temperature range extending from TL to TH but not elevate the temperature of the transmitter when the temperature of the atmosphere is in a second portion of the temperature range extending from TL to TH;
- an optical receiver in optical communication with the transmitter such that the receiver receives the modulated signals, the receiver including a demultiplexer for demultiplexing the received modulated signals and DBW representing the bandwidth of the demultiplexer included in the receiver;
  - the receiver being configured to operate in an atmosphere having an operational temperature range extending from RTL to RTH and the receiver electronics configured to control the temperature of the receiver such that the temperature of the receiver is above a second receiver temperature when a first receiver temperature is above a receiver temperature threshold and also when the first receiver temperature is below the receiver temperature threshold,
  - the first receiver temperature being selected from a group consisting of a temperature of the receiver and a temperature of the atmosphere in which the receiver is located,
  - the receiver temperature threshold being between RTL and RTH and the second receiver temperature being at least equal to the receiver temperature threshold.

18. The system of claim 17, further comprising: receiver electronics configured to maintain the temperature of the receiver at a constant temperature.

19. The system of claim 17 wherein the temperature of the receiver is independent of the temperature of the transmitter.

20. The system of claim 17, wherein receiver electronics elevate the temperature of the receiver when the first temperature is above the receiver temperature threshold but do not elevate the temperature of the receiver when the first temperature is above the receiver temperature threshold.

* * * * *